(12) United States Patent
Hu et al.

(10) Patent No.: US 9,588,136 B2
(45) Date of Patent: Mar. 7, 2017

(54) METHOD AND APPARATUS OF OPERATING A SCANNING PROBE MICROSCOPE

(71) Applicant: Bruker Nano, Inc., Santa Barbara, CA (US)

(72) Inventors: Yan Hu, Ventura, CA (US); Shuiqing Hu, Santa Barbara, CA (US); Chanmin Su, Ventura, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 15/137,937

(22) Filed: Apr. 25, 2016

(65) Prior Publication Data
US 2016/0313367 A1 Oct. 27, 2016

Related U.S. Application Data

(63) Continuation of application No. 14/288,180, filed on May 27, 2014, now Pat. No. 9,322,842, which is a continuation of application No. 12/618,641, filed on Nov. 13, 2009, now Pat. No. 8,739,309.

(60) Provisional application No. 61/114,399, filed on Nov. 13, 2008.

(51) Int. Cl.
| | |
|---|---|
| *G01Q 20/00* | (2010.01) |
| *B82Y 35/00* | (2011.01) |
| *G01Q 10/06* | (2010.01) |
| *G01Q 60/32* | (2010.01) |
| *G01Q 20/02* | (2010.01) |
| *G01Q 60/30* | (2010.01) |
| *G01Q 60/34* | (2010.01) |

(52) U.S. Cl.
CPC .............. *G01Q 20/00* (2013.01); *B82Y 35/00* (2013.01); *G01Q 10/065* (2013.01); *G01Q 20/02* (2013.01); *G01Q 60/30* (2013.01); *G01Q 60/32* (2013.01); *G01Q 60/34* (2013.01)

(58) Field of Classification Search
None
See application file for complete search history.

(56) References Cited

U.S. PATENT DOCUMENTS

| | | | | | |
|---|---|---|---|---|---|
| 5,406,832 | A | * | 4/1995 | Gamble | B82Y 35/00 250/307 |
| 5,507,179 | A | * | 4/1996 | Gamble | B82Y 35/00 73/105 |
| 5,513,518 | A | * | 5/1996 | Lindsay | B82Y 35/00 73/105 |
| 5,955,660 | A | * | 9/1999 | Honma | B82Y 35/00 73/105 |
| 6,008,489 | A | * | 12/1999 | Elings | B82Y 35/00 250/234 |
| 6,134,955 | A | * | 10/2000 | Han | B82Y 35/00 73/105 |

(Continued)

*Primary Examiner* — Andrew Smyth
(74) *Attorney, Agent, or Firm* — Boyle Fredrickson S.C.

(57) ABSTRACT

An improved mode of AFM imaging (Peak Force Tapping (PFT) Mode) uses force as the feedback variable to reduce tip-sample interaction forces while maintaining scan speeds achievable by all existing AFM operating modes. Sample imaging and mechanical property mapping are achieved with improved resolution and high sample throughput, with the mode workable across varying environments, including gaseous, fluidic and vacuum.

15 Claims, 17 Drawing Sheets

(56) References Cited

U.S. PATENT DOCUMENTS

| | | | |
|---|---|---|---|
| 6,441,371 B1 * | 8/2002 | Ahn | B82Y 35/00 250/307 |
| 6,608,307 B1 * | 8/2003 | Baur | G01Q 10/065 250/306 |
| 6,894,272 B2 * | 5/2005 | Kranz | B82Y 35/00 250/234 |
| 6,906,450 B2 * | 6/2005 | Tamayo De Miguel | B82Y 35/00 310/316.01 |
| 6,945,099 B1 * | 9/2005 | Su | B82Y 35/00 73/105 |
| 7,074,340 B2 * | 7/2006 | Lugstein | B82Y 35/00 216/11 |
| 7,129,486 B2 * | 10/2006 | Spizig | B82Y 35/00 250/307 |
| 7,156,965 B1 * | 1/2007 | Li | G01Q 60/60 204/400 |
| 7,464,583 B1 * | 12/2008 | Kowalewski | G01Q 60/34 73/105 |
| 7,478,552 B2 * | 1/2009 | Gotthard | B82Y 35/00 73/105 |
| 7,596,989 B2 * | 10/2009 | Humphris | G01Q 70/14 73/105 |
| 7,665,350 B2 * | 2/2010 | Giessibl | G01Q 60/34 73/105 |
| 7,810,166 B2 * | 10/2010 | Struckmeier | B82Y 35/00 850/1 |
| 2002/0096642 A1 * | 7/2002 | Massie | B82Y 35/00 250/453.11 |
| 2004/0020279 A1 * | 2/2004 | Degertekin | B82Y 35/00 73/105 |
| 2006/0005634 A1 * | 1/2006 | Schroeder | B01L 3/50273 73/861 |
| 2006/0219905 A1 * | 10/2006 | Gibson | G11C 8/08 250/310 |
| 2007/0024295 A1 * | 2/2007 | Humphris | G01Q 70/14 324/754.17 |
| 2007/0220958 A1 * | 9/2007 | Gotthard | B82Y 35/00 73/105 |
| 2008/0011065 A1 * | 1/2008 | Su | B82Y 35/00 73/105 |
| 2008/0022759 A1 * | 1/2008 | Su | B82Y 35/00 73/105 |
| 2008/0127722 A1 * | 6/2008 | Su | B82Y 35/00 73/105 |
| 2008/0277582 A1 * | 11/2008 | Shi | B82Y 35/00 250/309 |
| 2008/0295583 A1 * | 12/2008 | Giessibl | G01Q 60/34 73/105 |
| 2009/0032706 A1 * | 2/2009 | Prater | B82Y 35/00 250/307 |

* cited by examiner

Before Background Subtraction

Subtracted Background

After Background Subtraction

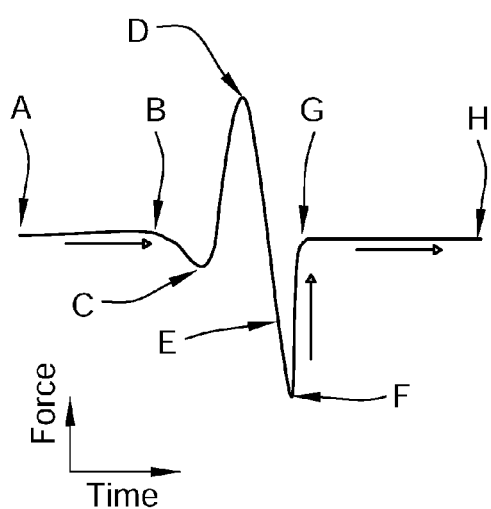# 
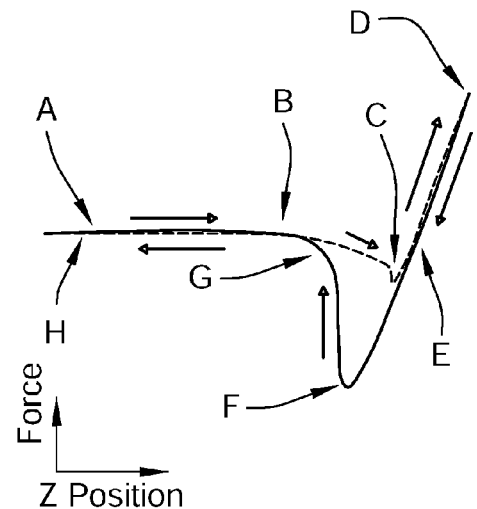
FIG. 20A
FIG. 20B
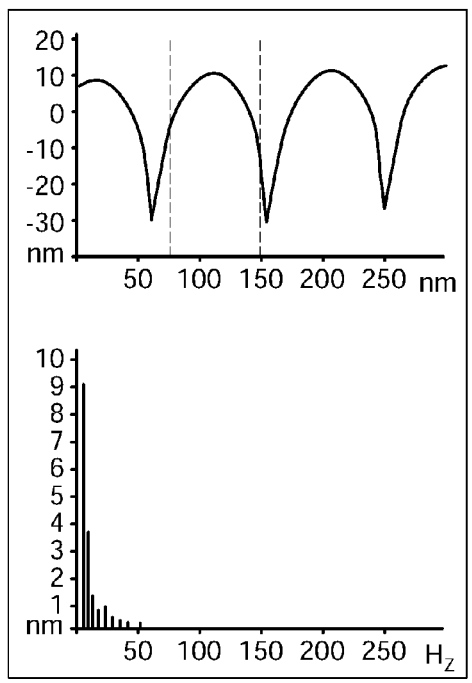
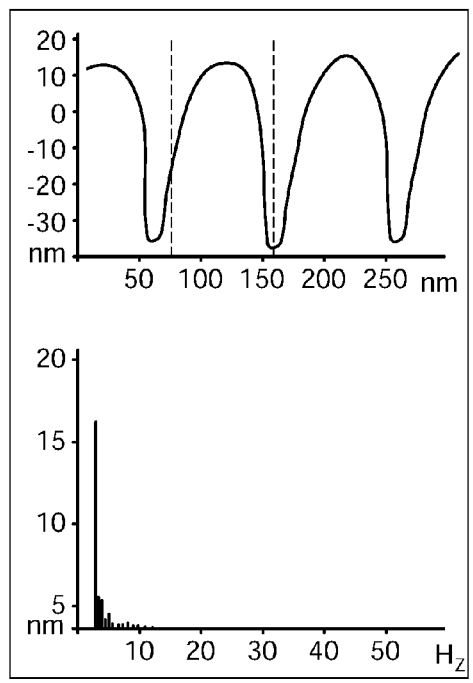
FIG. 21A
FIG. 21B

METHOD AND APPARATUS OF OPERATING A SCANNING PROBE MICROSCOPE

CROSS-REFERENCE TO RELATED APPLICATIONS

This application is a continuation of U.S. Non-Provisional patent application Ser. No. 14/288,180, filed May 27, 2014 (and issued as U.S. Pat. No. 9,322,842 on Apr. 26, 2016), which is a continuation of U.S. Non-Provisional patent application Ser. No. 12/618,641, filed Nov. 13, 2009 (and issued as U.S. Pat. No. 8,739,309 on May 27, 2014), which claims priority under 35 U.S.C. §119(e) to U.S. Provisional Patent Application No. 61/114,399, filed on Nov. 13, 2008, the entirety of each of which is expressly incorporated by reference herein.

BACKGROUND OF THE INVENTION

Field of the Invention

The present invention is directed to scanning probe microscopes (SPMs), including atomic force microscopes (AFMs), and more particularly, to a mode of AFM operation that provides force control at high speed, low tip-sample interaction forces and high resolution.

Description of Related Art

Scanning probe microscopes (SPMs), such as the atomic force microscope (AFM), are devices which typically employ a probe having a tip and which cause the tip to interact with the surface of a sample with low forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample, and a corresponding map of the sample can be generated.

A typical AFM system is shown schematically in FIG. 1. An AFM 10 employs a probe device 12 including a probe 17 having a cantilever 15. A scanner 24 generates relative motion between the probe 17 and a sample 22 while the probe-sample interaction is measured. In this way, images or other measurements of the sample can be obtained. Scanner 24 is typically comprised of one or more actuators that usually generate motion in three mutually orthogonal directions (XYZ). Often, scanner 24 is a single integrated unit that includes one or more actuators to move either the sample or the probe in all three axes, for example, a piezoelectric tube actuator. Alternatively, the scanner may be a conceptual or physical combination of multiple separate actuators. Some AFMs separate the scanner into multiple components, for example an XY actuator that moves the sample and a separate Z-actuator that moves the probe. The instrument is thus capable of creating relative motion between the probe and the sample while measuring the topography or some other property of the sample as described, e.g., in Hansma et al. U.S. Pat. No. RE 34,489; Elings et al. U.S. Pat. No. 5,266,801; and Elings et al. U.S. Pat. No. 5,412,980.

Notably, scanner 24 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in application Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

In a common configuration, probe 17 is often coupled to an oscillating actuator or drive 16 that is used to drive probe 17 to oscillate at or near a resonant frequency of cantilever 15. Alternative arrangements measure the deflection, torsion, or other characteristic of cantilever 15. Probe 17 is often a microfabricated cantilever with an integrated tip 17.

Commonly, an electronic signal is applied from an AC signal source 18 under control of an SPM controller 20 to cause actuator 16 (or alternatively scanner 24) to drive the probe 17 to oscillate. The probe-sample interaction is typically controlled via feedback by controller 20. Notably, the actuator 16 may be coupled to the scanner 24 and probe 17 but may be formed integrally with the cantilever 15 of probe 17 as part of a self-actuated cantilever/probe.

Often, a selected probe 17 is oscillated and brought into contact with sample 22 as sample characteristics are monitored by detecting changes in one or more characteristics of the oscillation of probe 17, as described above. In this regard, a deflection detection apparatus 25 is typically employed to direct a beam towards the backside of probe 17, the beam then being reflected towards a detector 26, such as a four quadrant photodetector. The deflection detector is often an optical lever system such as described in Hansma et al. U.S. Pat. No. RE 34,489, but may be some other deflection detector such as strain gauges, capacitance sensors, etc. The sensing light source of apparatus 25 is typically a laser, often a visible or infrared laser diode. The sensing light beam can also be generated by other light sources, for example a He—Ne or other laser source, a superluminescent diode (SLD), an LED, an optical fiber, or any other light source that can be focused to a small spot. As the beam translates across detector 26, appropriate signals are processed by a signal processing block 28 (e.g., to determine the RMS deflection of probe 17). The interaction signal (e.g., deflection) is then transmitted to controller 20, which processes the signals to determine changes in the oscillation of probe 17. In general, controller 20 determines an error at Block 30, then generates control signals (e.g., using a PI gain control Block 32) to maintain a relatively constant interaction between the tip and sample (or deflection of the lever 15), typically to maintain a setpoint characteristic of the oscillation of probe 17. The control signals are typically amplified by a high voltage amplifier 34 prior to, for example, driving scanner 24. For example, controller 20 is often used to maintain the oscillation amplitude at a setpoint value, $A_S$, to insure a generally constant force between the tip and sample. Alternatively, a setpoint phase or frequency may be used. Controller 20 is also referred to generally as feedback where the control effort is to maintain a constant target value defined by setpoint.

A workstation 40 is also provided, in the controller 20 and/or in a separate controller or system of connected or stand-alone controllers, that receives the collected data from the controller and manipulates the data obtained during scanning to perform data manipulation operations such as point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM.

AFMs may be designed to operate in a variety of modes, including contact mode and oscillating mode. Operation is accomplished by moving the sample and/or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one practical mode of AFM operation, known as TappingMode™ AFM (TappingMode™ is a trademark of the present assignee), the tip is oscillated at or near a resonant frequency of the associated cantilever of the probe, or harmonic thereof. A feedback loop attempts to keep the amplitude of this oscillation constant to minimize the "tracking force," i.e., the force resulting from tip/sample interaction, typically by controlling tip-sample separation. Alternative feedback arrangements keep the phase or oscillation frequency constant. As in contact mode, these feedback signals are then collected, stored and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research. Note that "SPM" and the acronyms for the specific types of SPMs, may be used herein to refer to either the microscope apparatus or the associated technique, e.g., "atomic force microscopy."

As with most measuring devices, AFMs often require a trade-off between resolution and acquisition speed. That is, some currently available AFMs can scan a surface with sub-angstrom resolution. These scanners are capable of scanning only relatively small sample areas, and even then, at only relatively low scan rates. Traditional commercial AFMs usually require a total scan time typically taking several minutes to cover an area of several microns at high resolution (e.g. 512×512 pixels) and low tracking force. The practical limit of AFM scan speed is a result of the maximum speed at which the AFM can be scanned while maintaining a tracking force that is low enough not to damage or cause minimal damage to the tip and/or sample. Great strides have been made in this area in which SPM has achieved video scan rates with high resolution for small samples and small scan sizes.

Nonetheless, given current limitations associated with known modes of operation, including both TappingMode™ AFM and contact mode, improvements have been desired. Again, in contact mode, lateral scanning of the tip creates large forces between the tip and sample that can compromise both. And when imaging soft samples such as biological samples and polymers, the surface can be destroyed, rendering the measurement useless, or at least deformed severely, thereby significantly compromising resolution. Note that "imaging" is used herein to indicate obtaining SPM data at multiple points of a sample surface, typically by providing relative scanning motion between the sample and probe and correspondingly interacting the sample and probe.

TappingMode™ AFM is a lower force technique and is the most widely used mode of AFM operation to map sample surfaces, especially for delicate samples. The typical force of the tip on the sample is about a few nN to tens of nN. Again, by oscillating the tip, rather than dragging the tip, the shear forces are minimized. That said, TappingMode™ AFM suffers from a drawback in that it is difficult to control the normal force acting on the sample surface. The user typically tries to select a setpoint that is only a small variation from the free air deflection/amplitude of the probe in order to minimize tip-sample interaction forces to get the best reproduction of the sample profile. The dilemma, especially for soft samples, is that if the imaging force is too low, the tip will not track the sample properly (i.e., maintain interaction with the sample during the scan), while if too high, damage/deformation of the sample may lead to an image that does not accurately reflect surface topography. Overall, the better this force can be controlled (i.e., the lower it can be maintained) the less chance of sample and/or tip damage, and thus resolution can be improved.

A review of the tip-sample forces in each of these modes provides insight in to the limitations of each. When a probe interacts with the surface through TappingMode™ AFM or Jumping Mode™ (see, e.g., U.S. Pat. Nos. 5,229,606, 5,266,801 and 5,415,027, the entirety of which are incorporated by reference herein), the tip touches the surface periodically. FIG. 2A illustrates the physical process within one period "T" of the tip motion. FIG. 2A shows tip trajectory in reference to the sample surface position. FIG. 2B shows the corresponding interaction force at the same time for tip trajectory at various positions. At the peak positions $A_{max}$, the tip is farthest from the sample surface and not interacting with the sample. As the tip continues to move down toward the horizontal axis (zero tip-sample separation) it will experience a near-field Van der Waals force, $F_{a\_vdw}$, causing the tip to snap into contact with the sample through Van der Waals attraction. After touching the sample, the tip remains in repulsive interaction for time zone δT. During this time, the tip is continuously contacting the sample. The positions below zero represent that the tip may have deformed the sample, causing its position to be shown below the sample surface.

As the tip departs the surface after δT, an attractive force will develop a capillary meniscus, exhibiting a maximum adhesion force $F_{a\_max}$ right before the meniscus is broken away. The tip then enters into a non-interactive region and continues to a maximum departure position.

In the interaction free zone, when the probe is farther from the surface, the interaction force is zero or sufficiently near zero to form a baseline, as indicated in FIG. 2B. In FIG. 2B, the force above the horizontal axis is repulsive while those points below the horizontal axis represent a net attractive or adhesive force. The maximum repulsive force $F_{r\_max}$ usually corresponds to the lowest or smallest tip position or separation relative to the sample surface.

In prior known modes disclosed in TappingMode™ AFM and JumpingMode™ AFM, the amplitude $A_{max}$ or RMS of the tip oscillation amplitude is used as the feedback control parameter. An example of such feedback control apparatus is shown in FIG. 1.

In conventional control, typically implemented using a gain control feedback loop, positioning actuators and a cantilever response detection component (quadrant photodetector, for example), the AFM uses detected probe deflection or an RMS signal corresponding to cantilever (i.e., probe) motion as an indication of the tip-surface interaction and uses the feedback loop to maintain constant or RMS deflection.

Yet a major limitation of conventional AFM is its inability to acquire quantitative mechanical property information simultaneously with the high-resolution imaging. AFM has been primarily focused on topographical imaging. Little progress has been made in achieving quantitative mechanical mapping, including elasticity, plasticity, and work of adhesion.

Moreover, TappingMode™ control uses amplitude or phase of the measured deflection signal to control tip-surface interaction using feedback. Notably, both amplitude and phase are average properties of the probe/tip oscillation using at least one cycle of interaction. More specifically, the average pertains to probe/sample interactions occurring in all the positions in the tip trajectory (FIG. 2). Therefore, there is no possibility for the control feedback to be based on substantially instantaneous tip-sample interaction. Note that instantaneous interaction here refers to any point (for example, within two microseconds) of interaction in FIG. 2B (discussed further below).

In addition, it is important to note that TappingMode™ AFM was created to overcome what is known as the stick-in condition that occurs when probe touches the sample intermittently. As the probe touches the sample, capillary force will tend to catch the tip and prevent it from releasing. The amplitude of probe oscillation in TappingMode™ will drop to zero, thereby causing feedback oscillation. This problem was overcome when using TappingMode™ by using probes having a certain stiffness, usually 10 N/m (Newton/meter) to 60 N/m, with a nominal value of 40 N/m, while operating the TappingMode™ AFM at an oscillation amplitude higher than about 10 nm peak-to-peak. Under these conditions, as the probe touches surface, the kinetic energy of the tapping probe coverts to enough static elastic energy to overcome the capillary force, assuring steady amplitude in each cycle. One drawback of this mode is that the kinetic energy stored in the probe is also proportional to the cantilever spring constant. When employing a lower spring constant cantilever, such as 1 N/m, TappingMode™ is impossible when measuring many materials because the cantilever cannot overcome the capillary adhesion forces using its own resonance oscillation energy. Consequently, most TappingMode™ applications are only possible when one uses a stiff cantilever generally known in the art as a lever.

In an alternate mode of operating an SPM, known as the pulsed-force mode or PFM (see, e.g., U.S. Pat. No. 6,880,386 and U.S. Pat. No. 7,129,486), the amplitude of the oscillation of the probe is adjusted so the tip goes in and out of contact during each cycle. In this mode, control is provided by monitoring tip-sample interaction forces. It operates based on properties associated with a force curve, another common measurement made in the AFM field to measure material properties at a particular location. Force measurements are common, and can be mapped over an entire sample to create what is known as a force-volume image.

In PFM, by analyzing the shape of the force-distance curve, and using the data to control the forces acting between the tip and the sample, the amount of data acquired is lessened compared to other modes of SPM operation. Importantly, PFM typically needs to operate at $F_{r\_i}$ (discussed below) or the peak pulse force, which substantially exceeds the adhesion induced deflection, as well as coupling induced deflections. As a result, a high repulsive force is needed as a control reference. Such high force could damage the sample or the tip, and thus prevent acquisition of high resolution images. Moreover, PFM has other limitations, particularly with respect to operating speed and resolution limitations, and thus, though it has been implemented to image soft samples, it has not been more widely adopted for all types of AFM imaging applications. In addition, when imaging in a fluid environment provide further challenge to PFM since viscous force in fluid produces large deflection even when the cantilever probe is not interacting with the sample.

More particularly, a main reason why imaging speed is limited in standard PFM AFM is illustrated in FIG. 2C. FIG. 2C is a graph of tip-sample interaction force versus time. The interaction force is plotted as snap-to-contact at "A", at which point repulsive force (sample on tip) initiates at "B." Peak repulsive force occurs at about "C" as adhesive forces pull on the tip until about point "D", the point at which the tip releases from the sample. Point E represents the deflection peak of the cantilever probe when it departs from the sample. Points C and E both present themselves as a peak in the deflection signal. In order to assure that feedback controls tip-sample interaction properly, the value of C should exceed E. In yet another constraint in PFM, a certain ringdown period (cycles of the probe oscillation at its resonance frequency) is required before it is possible to determine the baseline force needed to continue the scan. It is this waiting for the cantilever to "ringdown" (a free decay process, as in TappingMode™) that limits the modulation frequency, and thus scan speed. More particularly, modulation frequency is significantly less than the probe resonance frequency (for example, a fifth or more below the probe resonance frequency).

SUMMARY OF THE INVENTION

The preferred embodiments move the tip substantially perpendicularly to the sample surface to cause the tip to interact with the sample, and then depart from the sample. The embodiments control the feedback loop using instantaneous interaction force (e.g., substantially orthogonal to the sample surface) at any interaction point, preferably using the maximum repulsive force. This new mode of operation takes advantage of the instantaneous response of the probe upon tip-sample interaction (no need to wait for ringdown like prior techniques, the present technique determines a baseline or zero force reference and forcefully substantially instantaneously brings the tip back to the surface), using the feedback loop to maintain a steady state interaction, and to control tracking of the tip on the sample. By moving the tip perpendicularly to the sample surface, this mode shares the advantages of TappingMode™ AFM to at least substantially eliminate friction forces during raster scanning or other relative probe sample motion in the XY plane. In addition, the implementation of this mode minimizes parasitic coupling so that a far more sensitive force control than PFM and TappingMode™ AFM (at least three (3) orders magnitude), can be accomplished. In doing so, the lowest force imaging (using alternating force) known in the AFM art is realized and directly controlled, thus allowing the AFM to provide improved high resolution images even higher than TappingMode™ AFM at speeds exceeding typical TappingMode™ AFM speeds (about 1 kHz bandwidth). An added benefit is that each cycle of the vertical movement produces a force curve, or multiple force curves at each pixel, allowing simultaneous acquisition and mapping of height and mechanical property data. This method is therefore called Peak Force Tapping (PFT) mode since it generates and analyzes each and every individual force curve, then measures and controls the corresponding peak interaction forces during each tip tapping on the sample with imaging speed higher than TappingMode™ imaging speed.

In accordance with a first aspect of the invention, a method of operating a SPM includes generating relative motion between a probe and a sample and detecting motion of the probe. The method recovers, from the detected probe motion, a probe-sample interaction that is substantially independent of parasitic probe deflection (i.e., parasitic cantilever motion).

In another aspect of the invention, a method of operating a SPM includes generating an image while maintaining a maximum repulsive probe-sample interaction force of no more than about 10 pN during each cycle of substantially perpendicular cyclical movement of the tip relative to the sample. Such interaction force can be directly controlled and accurately calibrated.

According to another aspect of the invention, a method of operating an SPM includes generating an image for at least 1 hour with peak force of less than 5 nN, without user intervention, while maintaining an image resolution better than 5 nanometers regardless of environment, including ambient, gaseous, fluid and vacuum.

In another aspect of the invention, a method of operating an SPM includes generating at least one force-distance curve for each imaging pixel. The force-distance curve can be used to produce accurate measurement of one or more of Van der Waals adhesion, elasticity, work of adhesion of tip-sample interface, plasticity such as hardness and viscoelasticity.

According to another aspect of the invention, the Peak Force Tapping method of operating an SPM includes using cantilevers with spring constants equal to about 0.01 N/m to 1000 N/m (which can enable the capability to map mechanical properties over a range from about 10 kPa to 100 GPa). This range of applicable cantilevers is several orders of magnitude wider than cantilevers generally applicable to ContactMode AFM (0.01-1 N/m) and TappingMode™ AFM (1 N/m-40 N/m).

A SPM configured in accordance with the invention could be used to scan a wide variety of samples, including patterned wafers, biological samples in ambient and fluid, polymers, thin films, and data storage device component.

According to a further aspect of the invention, a method of operating a SPM includes interacting a tip of a probe with a sample, then terminating the interaction, resulting in a decaying probe oscillation. Thereafter, the method repeats the interaction before ringdown of the decaying probe oscillation is substantially complete, and detects the motion of the probe.

In another aspect of the preferred embodiments, a scanning probe microscope (SPM) includes an actuator to generate relative motion between a probe and a sample, and a detector to detect motion of the probe. A digital controller is also included to determine, from the detected probe motion, a probe deflection based on a probe-sample interaction, the probe deflection being substantially independent of parasitic probe deflection. Notably, the parasitic probe deflection is caused by the background associated with operation of the SPM, and corresponds to any relative periodic motion between the probe and the sample when the probe is not interacting with the sample. The controller subtracts the background from the detected probe motion, and controls the SPM in real time using the probe deflection.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIGS. 20A and 20B are graphs illustrating force versus time and z position respectively, when using instantaneous force control imaging according to the preferred embodiments;

FIGS. 21A and 21B are AFM images illustrating deep trench measurements using TappingMode™ AFM and instantaneous force control mode according to the preferred embodiments;

DETAILED DESCRIPTION OF THE PREFERRED EMBODIMENTS

The preferred embodiments are directed to a Peak Force Tapping® (PFT) Mode of AFM operation in which the interaction force between the probe (tip) and sample is monitored and used to control tip-sample separation at very low forces, yet without compromising scanning speed. The techniques described herein provide high resolution by maintaining probe tip-sample forces low, and realizes essentially real-time property mapping of sample surfaces. The preferred embodiments are inherently stable and thus facilitate long-term force control while maintaining the ability to acquire high integrity data (improved resolution). Moreover, because tuning is not required, unlike conventional Tapping-Mode™ AFM, the AFM setup is faster and easier than with other AFM modes. The key concepts driving the PFT Mode are illustrated graphically and discussed herein.

Practically, there were three major issues to be resolved before AFM control using instantaneous interaction force could be implemented. These issues were 1) accommodation of deflection background due to coupling; 2) determination of a baseline; and 3) determination of the instantaneous force, as defined herein.

Figure 2A:
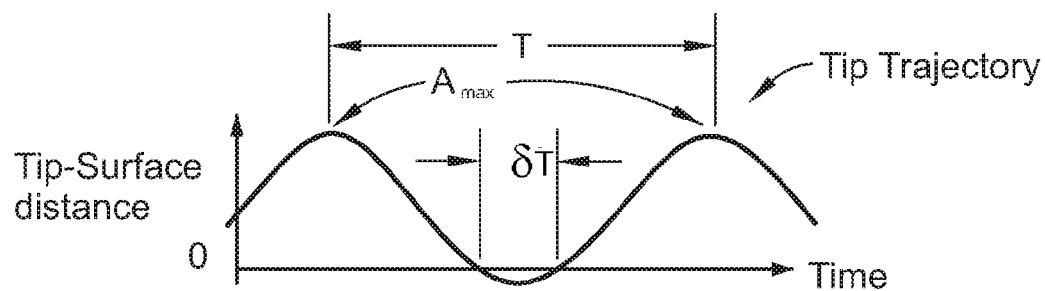
FIG. 2A is a graph of tip-sample separation versus time in oscillation AFM modes.

In FIG. 2A, a cycle of modulation that approaches and separates the probe from the sample (for example, using a drive to cyclically modulate probe-sample separation) is represented by a period T. The zero position (horizontal axis) represents the surface while the vertical axis is the separation. When the probe-sample separation crosses the horizontal zero line, the tip is in direct contact with the sample, as represented by region δT (the window of tip-sample contact). The interaction force corresponding to this region is plotted in FIG. 2B.

Figure 2B:
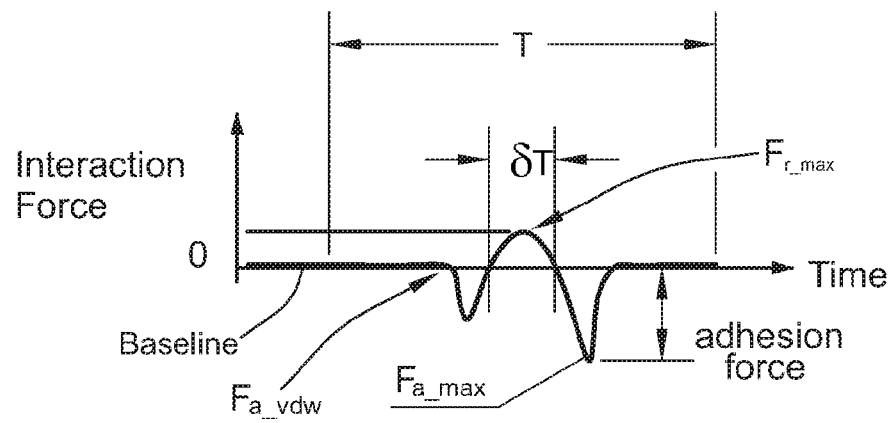
FIG. 2B is a graph of interaction force versus time in oscillation AFM modes.

With further reference to FIGS. 2A and 2B, $A_{max}$ is the maximum separation of the tip apex from the sample; $F_{a\_vdw}$ is the Van der Waals adhesion force; and $F_{a\_max}$ is the maximum adhesion due to capillary interaction and work of adhesion between the tip and the sample surface. Both repulsive force and adhesive force are calculated relative to the baseline as shown in FIG. 2B. It should be noted that the force referenced here is the total force acting on the entire tip which is typically, pyramidal-shaped. In fact, the very apex portion can enter the repulsive zone while the total force remains attractive. In this case, the feedback can still use the apex repulsive interaction force at the predefined synchronization position (defined as discussed below) for feedback, even though the total force at this point is attractive. This provides the benefit of operating with the minimum interaction force with the highest imaging resolution since the control is determined by the apex repulsive interaction which arises from the Pauli and ionic repulsions between the atoms of very apex of probes and the atoms or molecular of samples.

Figure 2C:
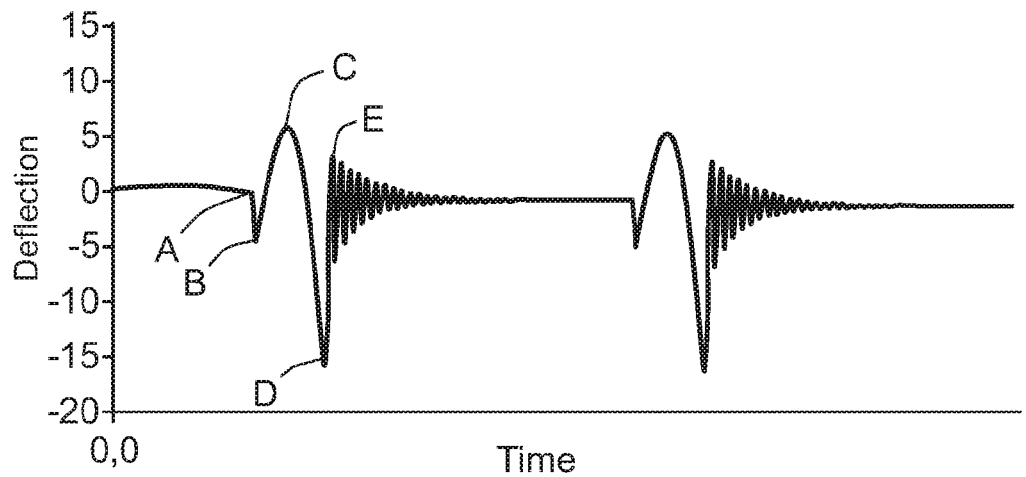
FIG. 2C is a graph of an SPM force curve illustrating probe sample interaction, "ringdown" an illustration of a second probe sample interaction.

It is important to differentiate cantilever deflection and tip-sample interaction force. While cantilever deflection is used to gauge the tip-sample interaction force, not all the deflection represents tip-sample interaction force; namely, parasitic forces contribute to cantilever deflection. For example, as shown in FIG. 2C, the cantilever deflection is plotted as a function of time, the figure representing actual deflection data. The oscillation after point "D" is due to cantilever free resonance decaying with time. This resonance deflection is not caused by tip surface interaction and is considered a parasitic deflection contribution (typically corresponding to parasitic cantilever or probe motion). Point E represents a maximum point of deflection at which the tip is not interacting with the sample. The "flat" portion of data also could have a slower variation of the deflection, when the tip is not interacting with the sample, typically caused by mechanical coupling of parasitic forces. Such coupling could be due to the modulation actuator itself, and/or cantilever response due to damping forces from air or fluid. It can also arise from laser interference. These parasitic effects will be further illustrated in subsequent figures.

In known force control systems, the control is based on a maximum force occurring in a period. Hence the repulsive force must be higher than any of the parasitic contributions to deflection for true tip-sample interaction to be differentiated from parasitic forces and historically used by the feedback loop. This force differentiation requirement required a relatively high imaging force that could damage the tip and/or the sample, thereby preventing the system from achieving high resolution.

Figure 3:
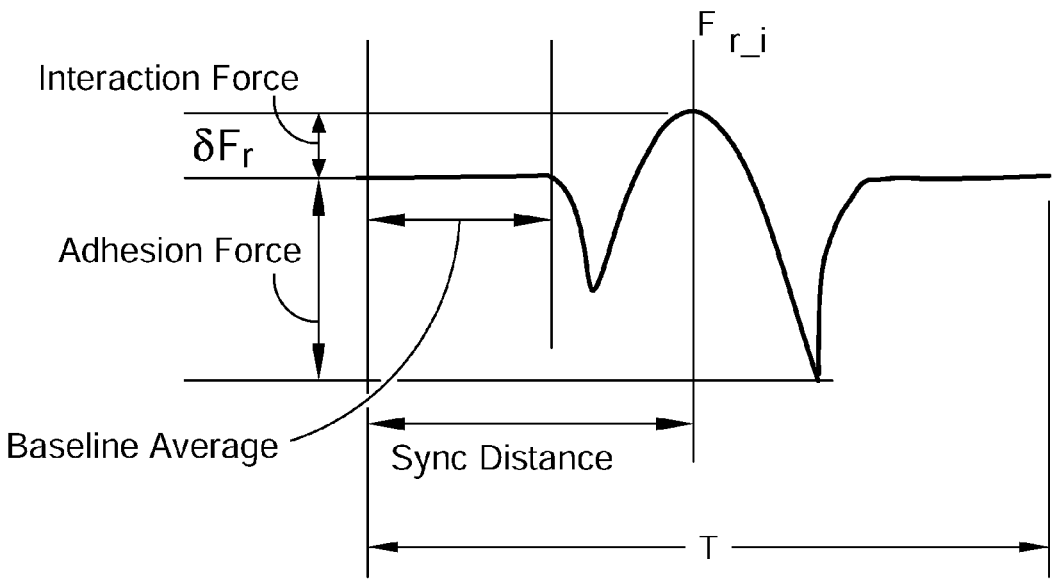
FIG. 3 is a graph of force versus time illustrating determining instantaneous force for feedback control according to the preferred embodiments.

In a preferred embodiment, the RMS or constant deflection is replaced by an instantaneous interaction force $F_{r\_i}$, determined according to FIG. 3, with the controller setpoint being:

$$\delta Fr = F_{r\_i} - F_{baseline} \qquad \text{Equation (1)}$$

$F_{baseline}$ is the interaction force when the probe is not contacting the sample. It should be zero. In AFM, the force is usually represented by cantilever deflection. In this case, $F_{baseline}$ corresponds to the cantilever deflection when the tip is not interacting with the surface. $F_{r\_i}$ is the interaction force when the tip is at close proximate contact with the surface. A synchronization algorithm is used to align the start time of each drive period, so that the region δT (FIGS. 2A-2B) coincides with the repulsive force and its maximum $F_{r\_max}$. The time from the start of the period to the occurrence of the $F_{r\_max}$ is the synchronization time, which can be precisely determined and controlled (described further below). Synchronization time distance (Sync Distance) can be determined by measuring the phase delay between the deflection response and the modulation drive signal. Once the Sync Distance is determined (when the probe is stationary in the xy direction), the same Sync Distance is used throughout all xy raster scanning positions. During imaging, the feedback operates to maintain $F_{r\_i}$ substantially constant while the value of $F_{r\_i}$ is determined by the Sync Distance. Note that the Sync Distance can also be generalized as the distance from the starting of the modulation period to the instant of interaction.

The synchronizing distance or Sync Distance can be precisely controlled. For example, if the tip oscillation period T is 100 µs, when the synchronizing distance is 48 µs, the interaction force occurring at the 48th µs will be used as the feedback control parameter. The feedback loop will try to maintain an instantaneous interaction force $F_{r\_i}$ (i=48 µs) at the 48th µs from the start of the period. In more general applications, any point of interaction force within the interaction region δT can be used for feedback. δT can also extends beyond the marked region in FIG. 2B to include the region of $F_{a\_vdw}$ (van der Waals attractive region) and $F_{a\_max}$ (the capillary adhesive region). The capillary adhesive region can also be adhesive interaction due to bonding force induced by functionalized probes and specific bonds on the sample.

To achieve an accurate measurement of the baseline, multiple deflection data points are gathered when the tip is not interacting with the sample and used to generate an averaged baseline level. Again, the non-interaction region (greatest separation/highest distance) can be determined by the Sync Distance because this region should be around the half cycle of the modulation period after the peak force position. The Sync Distance also determines the feedback force operating point, and the actual force is measured by δFr. δFr can be either negative or positive.

Due to adverse affects of drift (e.g., thermal) on the deflection, the corresponding force $F_{r\_i}$ may vary over time. The relative force δFr (relative to baseline determination) preferably is used for feedback control instead of $F_{r\_i}$ because it is a more accurate reflection of tip-surface interaction. This relative value removes the adverse influences due to system drift on cantilever deflection.

$\delta F_r$ also represents a controllable force by the feedback loop such that $\delta F_r$ remains constant over time at various positions as the tip scans across the sample.

Figure 4A:
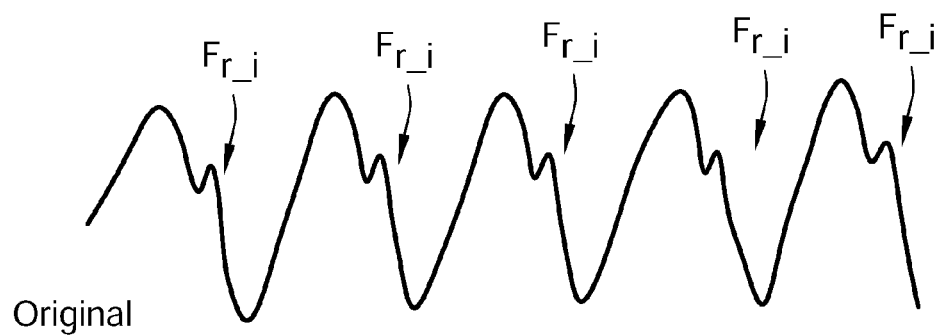
FIG. 4A is a schematic graph illustrating probe deflection versus time illustrating tip sample interaction force modulated periodically with parasitic oscillations in the system.
Figure 4B:
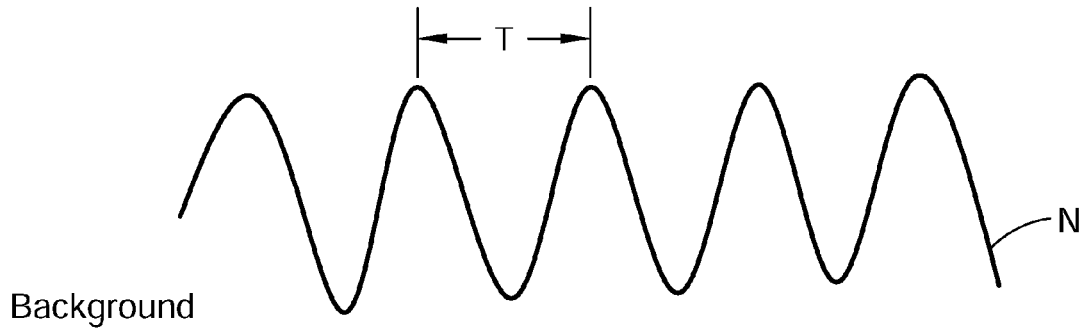
FIG. 4B is a schematic of cantilever probe response versus time with only hydrodynamic background oscillation due to parasitic sources.
Figure 4C:
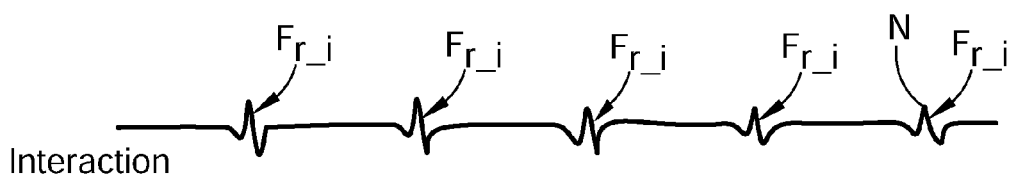
FIG. 4C is a graph of deflection error versus time after subtraction of hydrodynamic background oscillation.

In FIGS. 4A-4C, the cantilever response, when interacting with the sample surface, is a mixture of the tip-surface interaction force and the background coupling. Such response is exhibited schematically in FIG. 4A as "Original." The real tip-sample interaction force is only at the $F_{r\_i}$ portion (shown in 4C), which is buried within the background of parasitic cantilever or probe motion. By subtracting the background from the original data (for example, probe motion including due to both interaction forces and parasitic forces), the magnitude of the interaction force can be obtained. The background, illustrated as 4B, can be caused by mechanical coupling of resonances from the AFM system, and/or cantilever response to its environmental medium, such as air and fluid. It can also be induced by laser interference as the cantilever moves relative to the sample. The common characteristic of the background is that cantilever deflection displaying periodic change is similar to the tip trajectory, even when the tip is not interacting with the sample. A successful subtraction of background experimental data is shown in FIGS. 5A-5C.

Figure 5A:
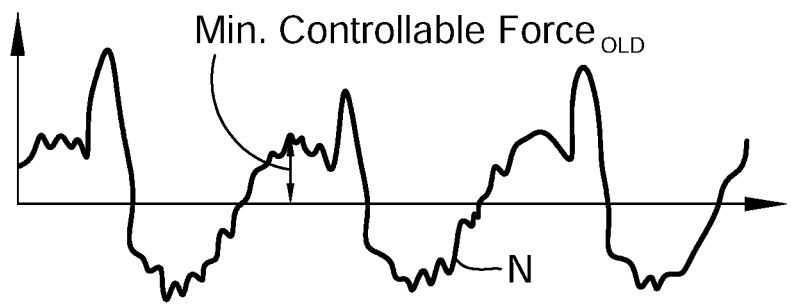
FIGS. 5A-5C is a series of graphs of a) deflection response before background subtraction, b) the subtracted background and c) the deflection error versus time after subtraction of hydrodynamic background oscillation.

More particularly, FIG. 5A shows a schematic illustration of the original probe deflection versus time. As noted, the deflection of the probe is highly influenced by parasitic sources that may be used to control tip-sample interaction. As shown, these periodic parasitic deflections are represented by the low frequency signal that we refer to herein as the "hydrodynamic background," for example or parasitic force in a more general term. The contribution to the probe deflection by these parasitic forces (including hydrodynamic forces, drag forces and air, off-axis motions, laser inference and any other periodic motion occurring when the probe is not interacting with the sample) is large. The actual tip-sample interaction force which should be used as the control signal in the preferred embodiments is superimposed on the parasitic background signal (FIG. 5B), so it can be a challenge detecting the actual tip-sample interaction forces. Stated another way, the minimum controllable force is determined by the background contribution to probe deflection (shown in FIG. 5A as the Min. Controllable Force$_{OLD}$—range of about less than 1000 micro-newtons to less than 10 pico-newtons). Notably, as is always the case, a noise signal "N" having a low amplitude relative to both the parasitic force contribution to the deflection and the contribution to the deflection by the tip-sample interaction force, is present.

Figure 5B:
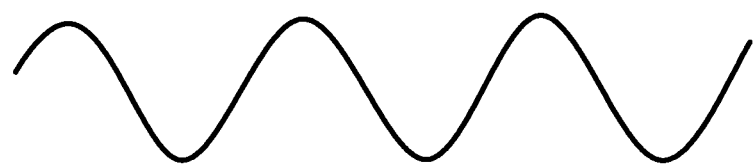
Figure 5C:
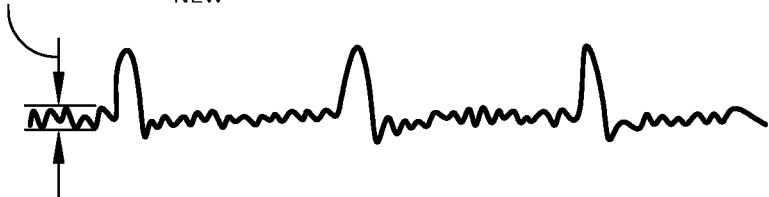

Turning to FIGS. 5B and 5C, one key concept to the present preferred embodiments is the subtraction of the parasitic background signal (FIG. 5B) from the deflection signal, as noted, thereby lowering the minimum controllable force. The background signal is determined by increasing tip-sample separation sufficiently to a controlled distance so that the probe does not interact with the sample, i.e., only parasitic forces are contributing to the detected deflection of the probe. The controlled distance is typically greater than 100 nm, though it can be less, ideally being a distance at which long range interaction forces do not contribute to probe deflection. As shown in FIG. 5C, the tip-sample interaction force contribution to the deflection after subtracting the parasitic background renders a deflection signal having clear peaks associated with the tip-sample interaction. Notably, the non-periodic noise will always be present, and in this case, determines the minimum controllable force as shown in FIG. 5C (Min. Controllable Force$_{NEW}$). For a very soft cantilever with a spring constant of 0.01 N/m and cantilever length of 100 um, this force can be about 1 pN.

It becomes clear that the minimum controllable force employable when performing parasitic background subtraction is lessened greatly (by, for example, three (3) orders of magnitude), allowing the preferred embodiments to control tip-sample separation so the probe-sample interaction forces are reduced to the pN range. The way in which this subtraction may be accomplished in the hardware is described further below with respect to FIG. 10.

Overall, it is primarily this ability to detect such small forces, and to use such forces as a control parameter in an SPM feedback loop, that allows an SPM operating according to the present invention to image a sample using what is referred to herein as "instantaneous force control." Instantaneous force control using real-time force detection offers improved control, thus improving image resolution and minimizing the chance for sample damage. In this context, real-time or instantaneous force detection implies that essentially each point of the varying force illustrated, for example, in FIG. 3 can be detected by the preferred embodiments and used instantaneously to control SPM operation. In other words, the varying forces acting on the probe due to probe-sample interaction during each cycle of the interaction between the probe and sample [or during each cycle of the modulation of the separation between the two, i.e., the force curve modulation] are detected and may be used by the AFM to image the sample in real-time. This instantaneous force control is used to provide AFM control at any interaction point within what would be one cycle of the modulation of the probe-sample separation. Because control is provided prior to completion of any would-be cycle of modulation (prior to the next approach), the feedback delay is greatly reduced. This will be shown further in connection with FIGS. 12A, 12B and 12C.

Yet another benefit in the peak force tapping control is that it does not need to be operated near the cantilever resonance frequency. Such operation can substantially eliminate cantilever delay due to transient resonance response, rendering instantaneous interaction control possible.

Figure 6A:
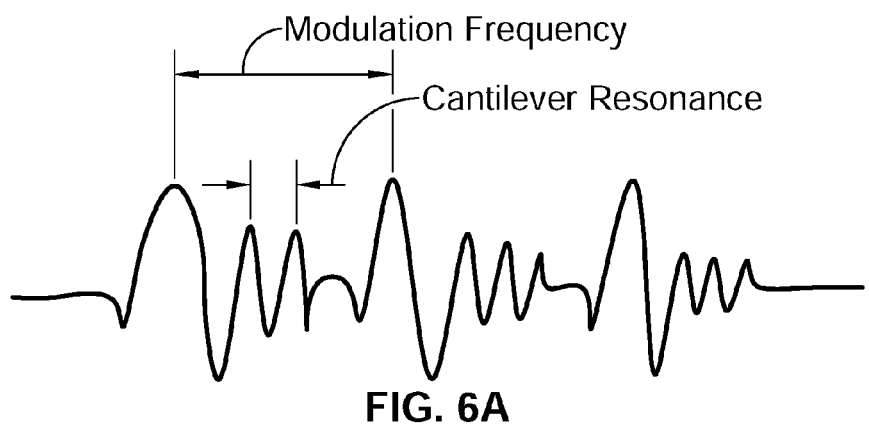
FIG. 6A is a schematic illustration of force versus time illustrating the baseline averaging method of the preferred embodiments.

Turning next to FIG. 6, the preferred embodiments also allow the AFM to operate at high speed by performing baseline averaging of the force curve to extract a zero force point quickly, and allow the system to cause the probe to interact with the sample with little time delay. In contrast to prior techniques represented by FIG. 2C, the modulation frequency of the present AFM is not limited by the requirement that the system wait to re-establish probe-sample interaction until probe "ringdown" completed (after the tip jumps off the sample surface, the decaying of probe oscillation to about 1/e) to stabilize the imaging system. The time required for ringdown is determined by the cantilever dynamics which are proportional to Q/f, where Q is the quality factor of the cantilever and f is the cantilever resonance frequency—typically tens of milliseconds for a conventionally used cantilever to stabilize. In the preferred embodiments, as shown in FIG. 6, upon ringdown, a few cycles of the cantilever resonance frequency are averaged to determine a zero force point (i.e., an at-rest baseline position) in essentially real time, and allow the system to cause the probe to interact with the sample much quicker than the system illustrated in FIG. 2C. In fact, by conducting an average of even one cycle of the cantilever resonance frequency upon ringdown, a robust estimation of the zero point (baseline) can be realized. As a result, modulation frequency can be increased significantly without compromising system stability. Moreover, the added benefit of operating faster, of course, is reducing the effect of noise within the system.

Figure 6B:
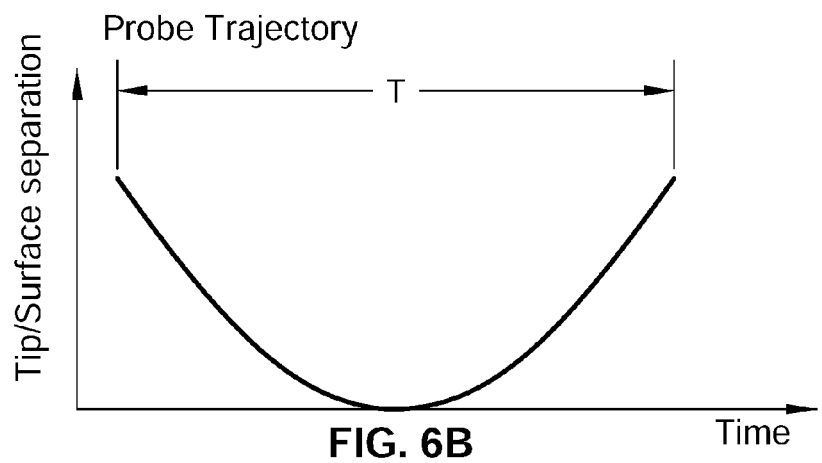
FIG. 6B is a graphic illustration of tip-sample separation versus time.
Figure 6C:
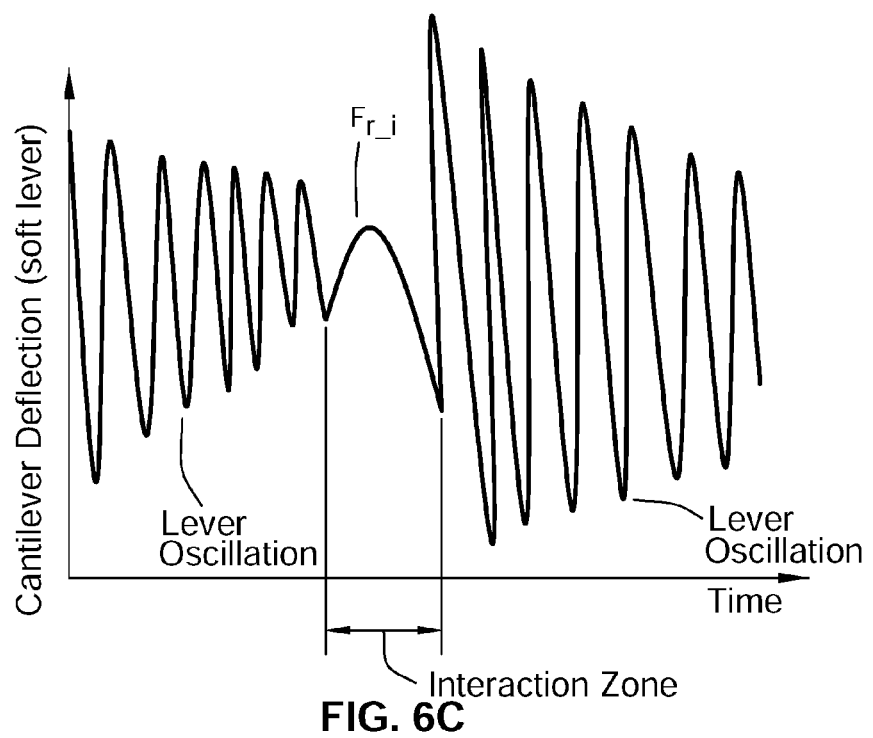
FIG. 6C is a graphic illustration of cantilever deflection versus time.

For measurement with very sensitive force detection, very soft cantilevers (spring constant 0.01 N/m to 0.3 N/m) are typically used. These levers have lower resonance frequency and very long ringdown time. More importantly, the adhesion induced oscillation (snap out of contact) is much stronger, as shown in FIG. 6C. In FIG. 6C, the deflection response of a soft cantilever is plotted as a function of time. The tip trajectory is also plotted as a position reference (FIG. 6B). As can be seen, the parasitic oscillation of the cantilever far outweighs the interaction force, making control basically impossible. Previous to the present invention, a user would have to wait long enough for the oscillation to disappear so that $F_{r\_i}$ becomes the only maximum, in order to have a steady control of the feedback. As the cantilever gets more sensitive, waiting for ringdown becomes prohibitively time consuming. The preferred embodiments of the present invention determine the baseline by separating the interaction zone and non-interaction zone through synchronous alignment to the closest position between the probe and the sample. A region corresponding to an "interaction zone" is locked through a synchronous marker, a reference trigger signal at the beginning of each cycle. Any point of deflection in this region can be used as the feedback parameter for steady state interaction control. All deflection data outside the interaction zone are averaged to a constant and used as the baseline for calculating $\Delta F_r$ in FIG. 3. By combination of the baseline detection and synchronous control, the relative force $\delta F$ can be accurately determined instantaneously and controlled. Such control allows $F_{r\_i}$ to be far below parasitic deflection, as illustrated in FIG. 6C.

Steady state again means a constant maximum force or a constant minimum force, or a combination of the characteristics of the interaction force curve shape in each cycle of the probe/sample relative motion.

Another major advantage of the present techniques is the ability to determine the baseline with high amplitude oscillatory data. Since the resonance frequency of the cantilever is known, in an alternative embodiment, the average can be determined in the non-interacting zone by analyzing an integer multiple of cycles of the cantilever resonance frequency. The integer cycle averaging can effectively remove the oscillatory deflection data, yielding a constant baseline.

Notably, cantilever resonance frequency can also be determined by known techniques such as frequency sweep and thermal tune.

Figure 7:
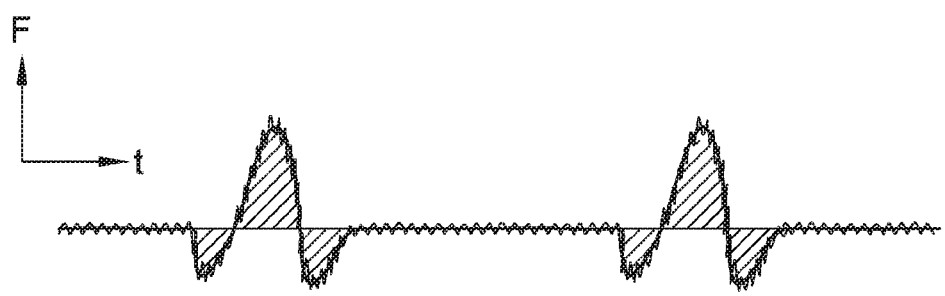
FIG. 7 is a schematic graph of force versus time illustrating the prior art technique of averaging to a force over an entire cycle (RMS) to detect tip sample interaction.
Figure 8A:
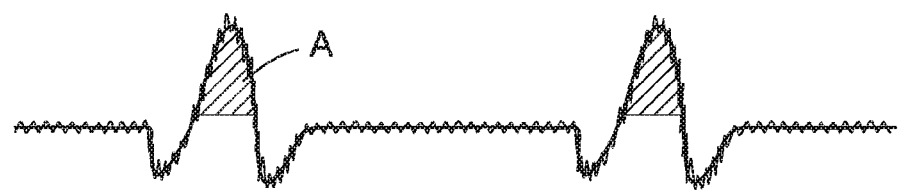
FIG. 8A is a schematic force versus time curve illustrating the gated average repulsive force control according to the preferred embodiments.
Figure 8B:
FIG. 8B is an illustration of an input synchronization signal sent with the force response due to tip-sample interaction to realize gated average repulsive force control according to the preferred embodiments.

Turning next to FIGS. 7 and 8A and 8B, the preferred embodiments also employ something referred to herein as "gated average repulsive force control." FIG. 7 schematically shows probe deflection, including a series of interaction periods, upon AFM operation. Prior control techniques using force as a control parameter average the total force over the entire cycle of tip-sample interaction, yielding an RMS value for comparison to the force setpoint. As understood in the art, the forces illustrated by the force curve are complex. Both repulsive and attractive forces operate on the probe tip during a cycle, as described above. By including, for example, the attractive force portion (C-D in FIG. 2C) which tends to cancel repulsive force, force sensitivity and imaging resolution are most often compromised.

Turning to FIGS. 8A and 8B, gated average repulsive force control is illustrated. In this embodiment, a system synchronization signal such as that shown in FIG. 8B is used to "gate" the repulsive force portion (B-C in FIG. 2C) of the force curve (illustrated by the shaded portion "A" of the deflection curve) by excluding the attractive force portion of the force curve. By controlling tip-sample separation based on the repulsive force portion of the force curve, force sensitivity and imaging resolution are increased due to reducing the adverse effect of the attractive force portion of the curve (i.e., attractive interaction forces are long range interaction forces, and therefore sense interaction over a much larger area, yielding lower resolution). Moreover, the gate operates to exclude the noise when performing the gated averaging. Again, the synchronization signal is timed so that only the repulsive force region is used. Such operation is ensured by using the gate at a pre-determined synchronization position as shown and described in connection with FIG. 3.

Figure 9A:
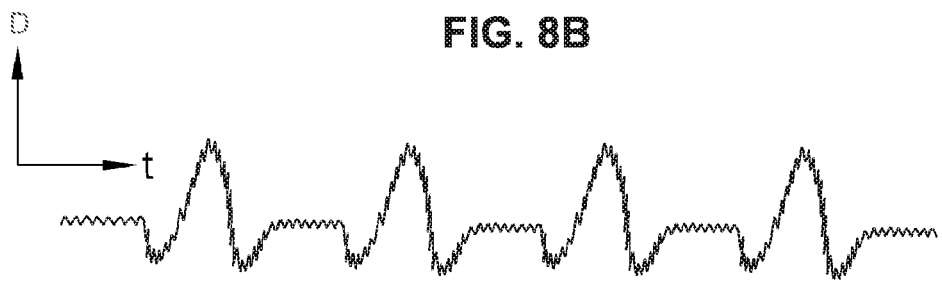
FIG. 9A is a schematic illustration of a series of force curves used in synchronous averaging according to the preferred embodiments.
Figure 9B:
FIG. 9B is a graph illustrating a synchronization signal sent with the deflection applied in the force curve of FIG. 9A.
Figure 9C:
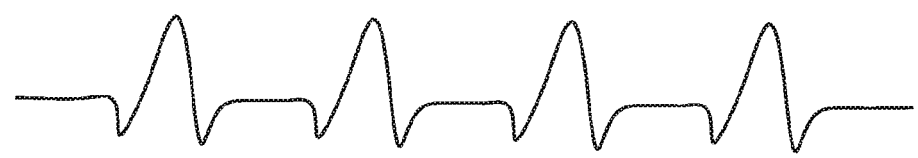
FIG. 9C is a graph illustrating a force curve signal after several cycles of synchronous averaging of FIG. 9A.

Taking the above further, as shown in FIGS. 9A and 9B, synchronous averaging can also be employed to further improve signal-to-noise ratio, and thus ultimately provide control at nearly the zero force point. FIG. 9A, similar to the other tip-sample deflection illustrations, shows several cycles of deflection of the probe as the tip interacts with the sample. As noted previously, a noise signal is always present when making these types of SPM/AFM measurements. By combining the deflection signal with a corresponding synchronization signal, such as that shown in FIG. 9B, synchronous averaging of the deflection is performed. As a result, the effect of noise is reduced greatly according to, $$\frac{D_1 + D_2 + D_3 + D_4 + \ldots D_N}{N} \quad \text{Equation (2)}$$

Where $D_i$ representing data in the ith cycle. The averaged signal with a signal to noise ratio improved by a factor of $\sqrt{N}$, thereby reducing the minimum controllable force (can use narrow lock-in bandwidth), is shown on FIG. 9C.

Figure 10:
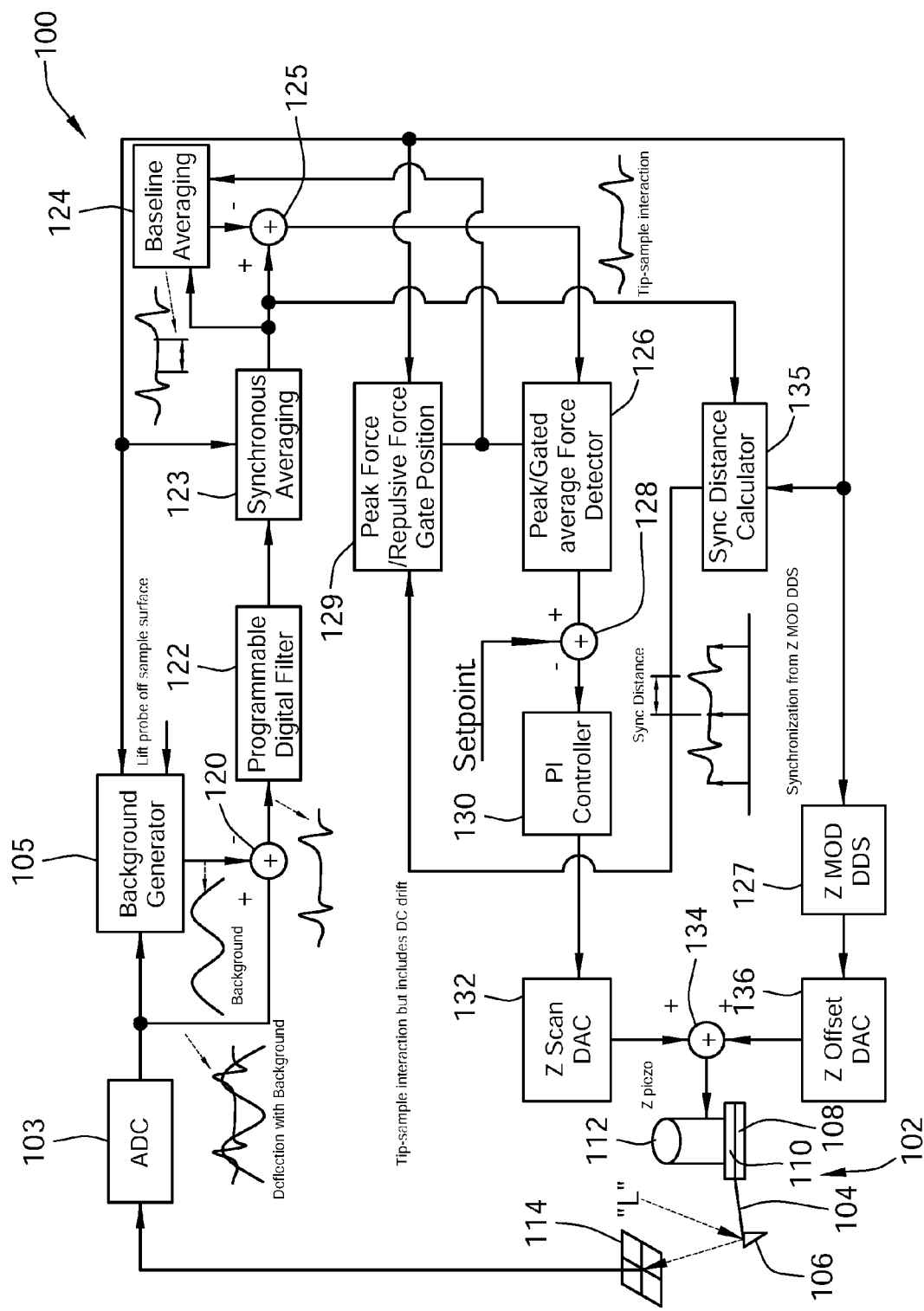
FIG. 10 is a schematic block diagram of an AFM operable in PFT Mode, according to one embodiment.

Turning next to FIG. 10, an AFM 100 operable in PFT Mode includes a probe 102 mounted in a probe holder 108 and having a cantilever 104 supporting a tip 106. In this case, tip-sample separation is modulated by an actuator 112 (for example, an XYZ piezoelectric tube) coupled to the probe holder 108 thereby. However, it should be understood that the preferred embodiments are applicable to those AFM instruments that modulate tip-sample separation by moving the sample in Z.

During operation, probe deflection is measured by bouncing a light beam "L" off the back of the probe and toward a detector 114, such as a four quadrant photodetector. The deflection signal is then transmitted to an analog to digital converter 103. The digitized signal is used for maintaining the tip-sample force low while operating the AFM at high speed.

In the embodiment shown in FIG. 10, probe deflection without tip-sample interaction is transmitted to a background generator 105. The background generator will create a periodic waveform corresponding to the background signal when the tip and sample are not interacting. This waveform can be generated by a DDS (Direct Digital Synthesis function generator) whose amplitude and phase are determined by a lock-in amplifier, and whose input is the background signal. This waveform can also be generated by synchronously averaging multiple cycles of the background with the help of a synchronization signal. A comparator circuit 120 processes the total deflection signal by subtracting the background signal so as to generate a signal representative of tip-sample interaction force independent of the parasitic background (FIGS. 4C and 5C). (Note that, though analog or digital circuitry may be described, it is understood that the operations may be performed in any conventional analog or digital circuitry, though a preferred embodiment utilizes FPGA architecture to implement the invention). This signal is then fed through a digital filter 122 that processes the post-subtraction deflection error to limit the processed ringdown oscillation of the lever to a number of selected cycles. The filtered signal is transmitted to synchronous averaging circuit 123 to further increase the signal to noise ratio. By averaging data in the non-interaction region with the help of synchronization, a baseline is determined from baseline averaging circuit 124. A comparator circuit 125 processes the total deflection signal by subtracting the baseline signal so as to generate a signal representative of tip-sample interaction force with no cantilever DC drift. This signal is further transmitted to a force detector 126.

Sync Distance calculator 135 determines the phase shift between the deflection and the Z modulation DDS (Block 127) that provides the drive and synchronization control in the form of a time delay. Peak force or repulsive force gate position generator 129 generates the timing signal for force detector 126, with the help of the synchronization marker and synchronization time distance. Force detector 126 analyzes the output of summation circuit 125 by either identifying the repulsive peak force or averaged repulsive force within the gated region illustrated in FIG. 8A. Again, by operating force detector 126 this way so force control can be triggered on a selected part of the force curve (e.g., repulsive force region), higher sensitivity is achieved by reducing the effect of the attractive force between the sample and tip. Moreover, signal to noise ratio is improved by excluding noise from the gate of detector 126. The gated repulsive force is then compared to an appropriate setpoint (Block 128), and an error signal is generated and transmitted to a control block (e.g., a PI controller 130). The control signal is then converted to analog (converter 132) and transmitted to a summing circuit 134 for combination with a synchronization signal from Block 127 after the synchronization signal is converted to analog with a converter 136. The output of summing circuit 134 is then applied to the Z-piezo 112 for actuating the z position (in this case, the probe) to maintain essentially steady state interaction between the tip and sample. A corresponding method of operation is described in further detail below in connection with FIG. 13.

Figure 11:
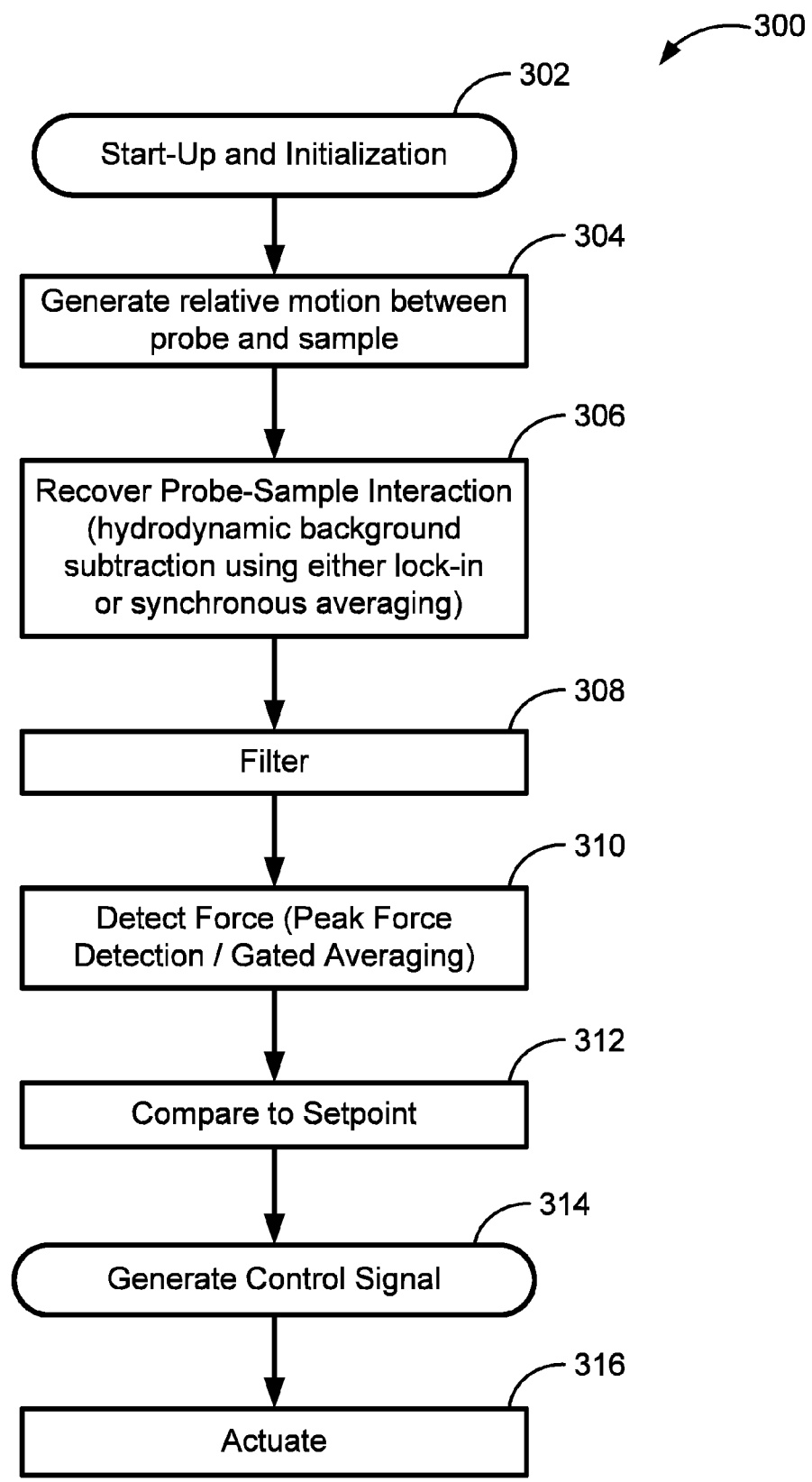
FIG. 11 is a flow diagram illustrating a method according to the preferred embodiments.

Turning to FIG. 11, a method 300 of operating an AFM according to PFT Mode is shown. After a setup and initialization Block 302 (no tuning required), the probe is driven into oscillation and engaged with the sample. Preferably, in Block 304, relative XY motion between the probe and sample is initiated (scanning).

Motion of the probe is then detected; in particular, probe deflection is detected and transmitted to the converter for further processing. In Block 306, the method then operates to recover probe-sample interaction as described above, preferably performing hydrodynamic background subtraction using either lock-in amplification, or more preferably, synchronous averaging of the deflection. After filtering the output in Block 308 (e.g., selecting a number of cycles of ringdown to process), the method detects the force (peak force detection/gated averaging), preferably using the repulsive region of the force curve, in Block 310. In Block 312, the force is then compared to the setpoint force, set according to the user's desired interaction force. The Z-actuator responds to the control signals in Block 316 to adjust tip-sample separation and maintain the setpoint force, with the control signals being used to generate an image of the sample.

Figure 12A:
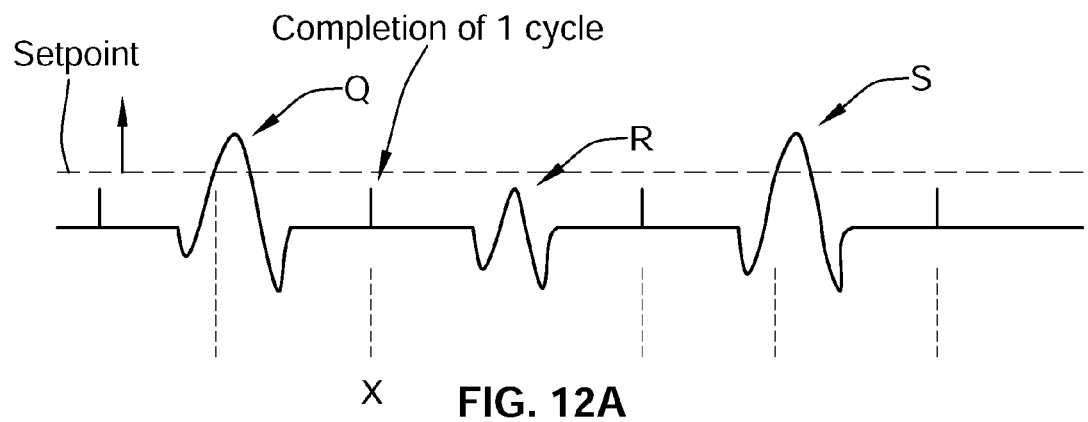
FIG. 12A is a schematic graph of a force curve illustrating the system setpoint and measured deflection.
Figure 12B:
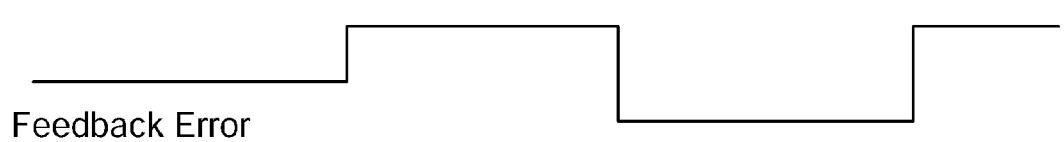
FIG. 12B is a schematic illustration of the feedback error produced according to prior art methods that control AFM operation by triggering on force after completion of one modulation cycle.
Figure 12C:
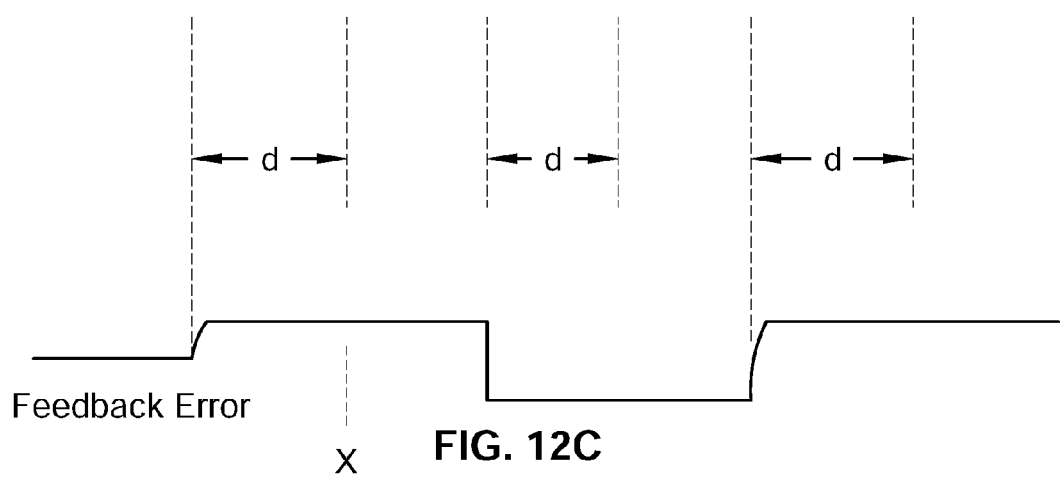
FIG. 12C is a schematic illustration of the feedback error, similar to FIG. 12B, according to the preferred embodiments of the present invention.

Turning to FIGS. 12A-12C, an illustration of the ability of the preferred embodiments to provide instantaneous force feedback is shown. In FIG. 12A, several schematic force versus time curves are shown with different peak repulsive forces. Notably, interactions Q and S exceed the threshold force defined by the setpoint, while interaction R illustrates a peak repulsive force below that of the setpoint. The feedback error is illustrated as shown in FIG. 12B for prior art force feedback systems. More particularly, once the repulsive force exceeds the setpoint, a delay "d" is shown prior to mapping peak repulsive force at X for the first interaction. This is similar for the interaction labeled S in which the feedback error is not established until well after the point at which the repulsive force begins to exceed the setpoint.

To the contrary, as shown in FIG. 12C, the response to any force larger than the setpoint is detected essentially instantaneously, given less feedback delay due to the features of PFT Mode discussed above, including parasitic background subtraction, baseline averaging and gated average, repulsive force control, preferably in combination with synchronous averaging. By being able to quickly identify forces above the setpoint, the forces corresponding to tip-sample interaction can be minimized, thus providing a significant advantage in terms of AFM operation at high speed and high resolution. And this is especially true for rough samples in which sample surface changes can limit response time and/or resolution.

Algortihms

Figure 13:
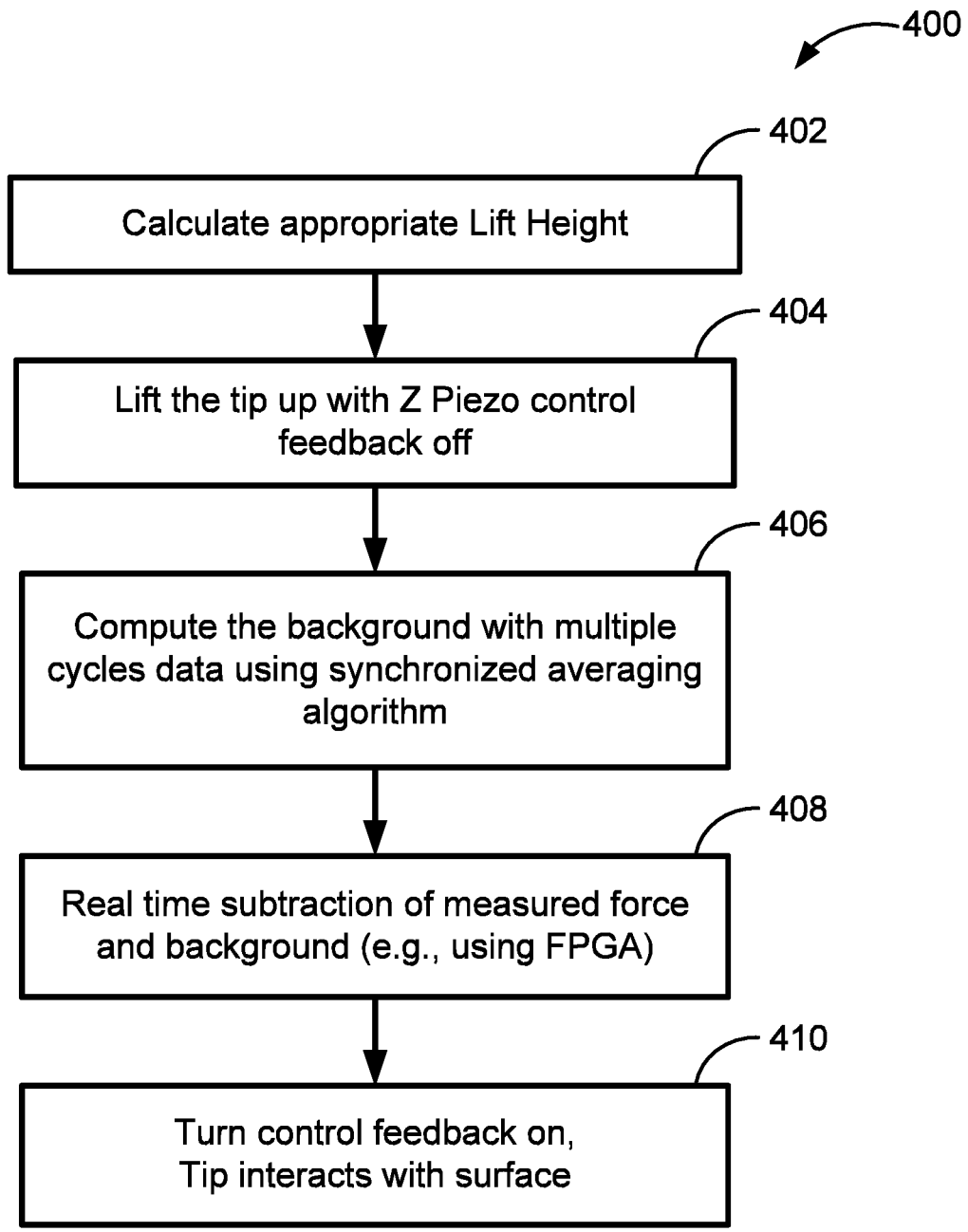
FIG. 13 is a flowchart illustrating a method according to the preferred embodiments illustrating deflection background subtraction.
Figure 14:
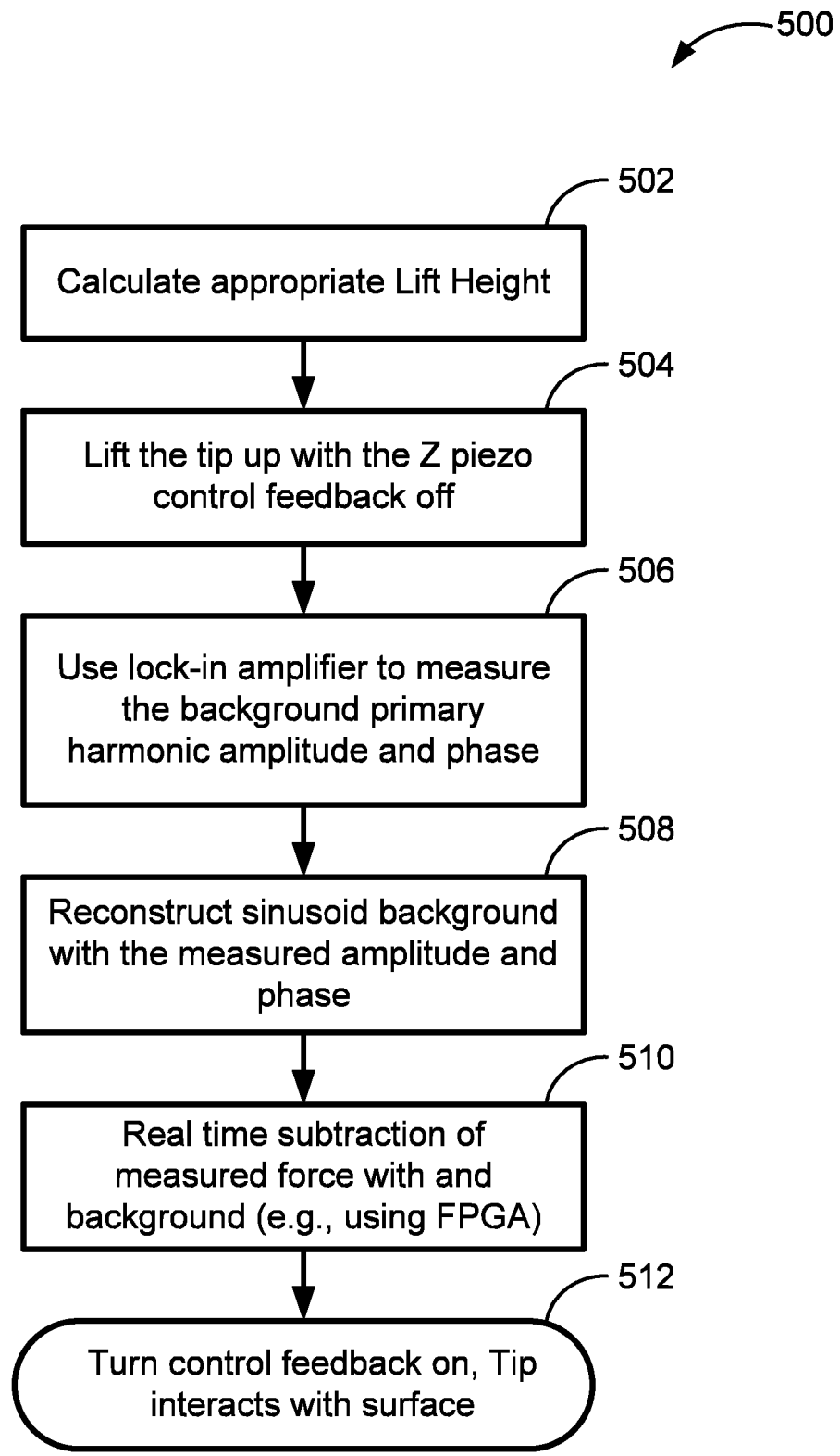
FIG. 14 is a flow diagram illustrating cantilever deflection background subtraction using a lock-in amplifier, according to the preferred embodiments.

To assure accurate subtraction of the background, two schemes have been developed, as shown in FIG. 13 and FIG. 14.

In FIG. 13, an algorithm 400 for the subtraction of cantilever deflection background (parasitic contributions to deflection) is shown. Blocks 402 and 404 assure the tip is far enough away (30 nm, for example) from the sample so that there is no repulsive impulse interaction on the surface, according to a user selection upon set up. Block 406 contains several sub-steps. The AFM system samples cantilever deflection data for multiple cycles and digitizes the data into multiple segments with each segment having a period T. The AFM method aligns each segment of data to the start of the period T, and then averages the data. Next, method 400 uses the averaged segment data as the background for the period T. Block 408 operates to subtract the background obtained from Block 406 from the measured data in each period T using, for example, an FPGA processor. Block 408 uses the background corrected data for feedback.

In FIG. 14, another algorithm 500 for subtracting background deflection is shown. Blocks 502 and 504, calculating lift height and lifting the tip with z feedback off, are used to ensure the tip is not interacting with the sample. Block 506 uses a lock-in amplifier with the drive signal moving the cantilever probe as the reference, and the cantilever deflection data as the lock-in input. In Block 508, the amplitude and phase data obtained from lock-in are used to construct a sinusoidal signal, and this signal is adjusted and used to subtract the deflection data until deflection becomes a constant (within the noise limit). Real time subtraction is performed in Block 510. Once sufficient subtraction is achieved (determined using a constant deflection when the tip is not interacting with the surface), the AFM is able to use the background corrected data for feedback in Block 512.

The background calculated according to FIGS. 13 and 14 varies substantially as the probe approaches the sample surface. Such variation is caused by hydrodynamic force as a function of the probe to sample surface distance. Such variation can also serve as an indicator of the closeness of the probe to the sample before it actually interacts with the sample. With this knowledge, the motorized engaging can proceed at a fast speed until a pre-defined background value is reached; slower engage steps can then be performed.

Figure 15:
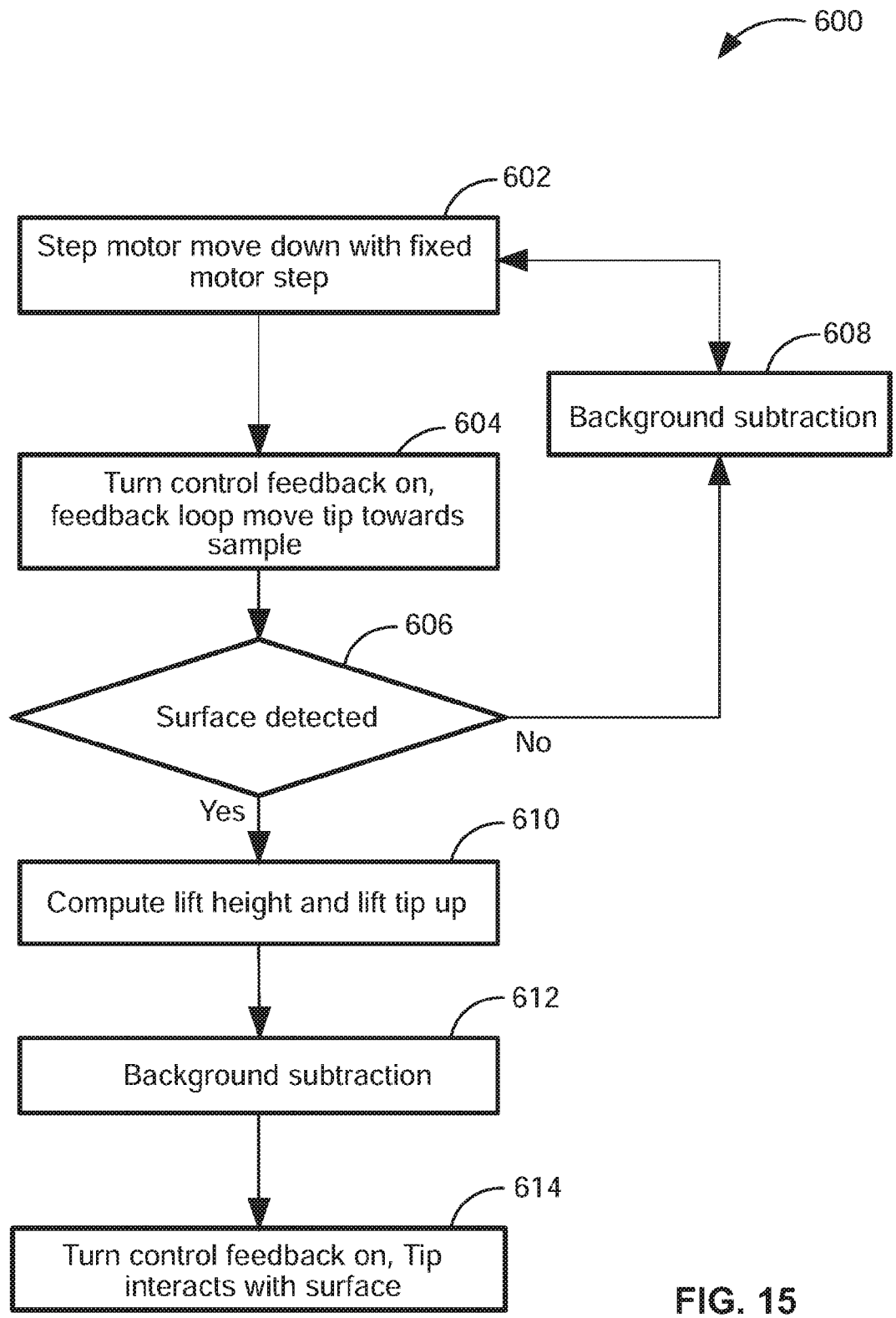
FIG. 15 is a flow diagram illustrating deflection background subtraction in a normal engage process.
Figure 16:
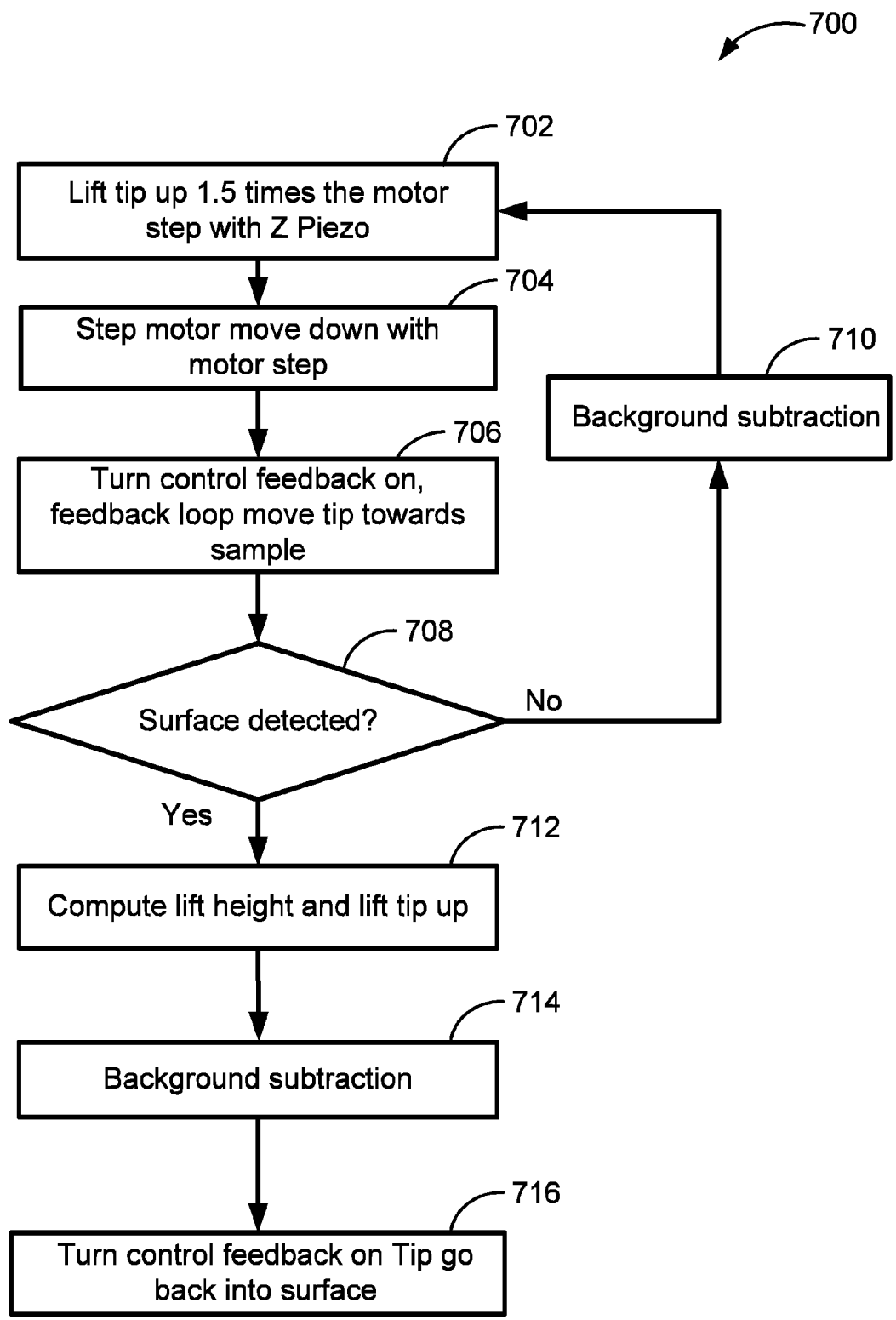
FIG. 16 is a flow diagram illustrating deflection background subtraction in a sewing engage process.

Background subtractions are preferably also executed during engagement of the probe with the sample surface, as shown in FIGS. 15 and 16.

The difference between the two engage methods is that the "normal" engage 600 in FIG. 15 uses a step motor only to drive the probe toward the sample to detect the sample surface. However, FIG. 16 shows a "sewing" engage that moves the probe with the Z-piezo at each motor step as the method 700 searches for the sample surface. Referring initially to FIG. 15, method 600 initially steps, in Block 602, a motor to reduce tip-sample separation according to a fixed step of, e.g., 0.1 nm to about 3 microns. With feedback control on (force detection according to the present techniques), the feedback loop controls the actuator to move the tip, in this case, toward the sample in Block 604. In Block 606, the algorithm determines whether the surface has been detected (i.e., whether the threshold setpoint force has been reached). If not, a background subtraction operation as described above in connection with FIG. 5 is performed prior to further stepping the motor in Block 602. If so, feedback is disengaged, and a lift height is computed by calculating the z movements between peak force and maximum negative adhesion force position, plus a certain margin (for example, 10 nm), and the tip can be raised in Block 610 (e.g., to minimize the chance of crash). Thereafter, in Block 612, a background subtraction operation is performed, and feedback control according to the present techniques is again initiated in Block 614.

In FIG. 16, Blocks 708, 712, 714 and 716 correspond directly with Blocks 606, 610, 612 and 614 of the algorithm 600 of FIG. 15. However, prior to detecting the surface, a sewing engage such as that known in the art is employed to lift the tip in Block 702 prior to stepping the motor down in Block 704; in this case, the lift is 1.5 times the motor step. The amount of lift may be user-selected based on type of sample, etc. Thereafter, feedback is turned on in Block 706 to detect force according to the present techniques. If the surface is not detected, the algorithm 700 performs a background subtraction in Block 710 (similar to Block 608) prior to conducting another lift in Block 702. Once the surface is detected, the SPM can image the sample in Block 716.

Figure 17:
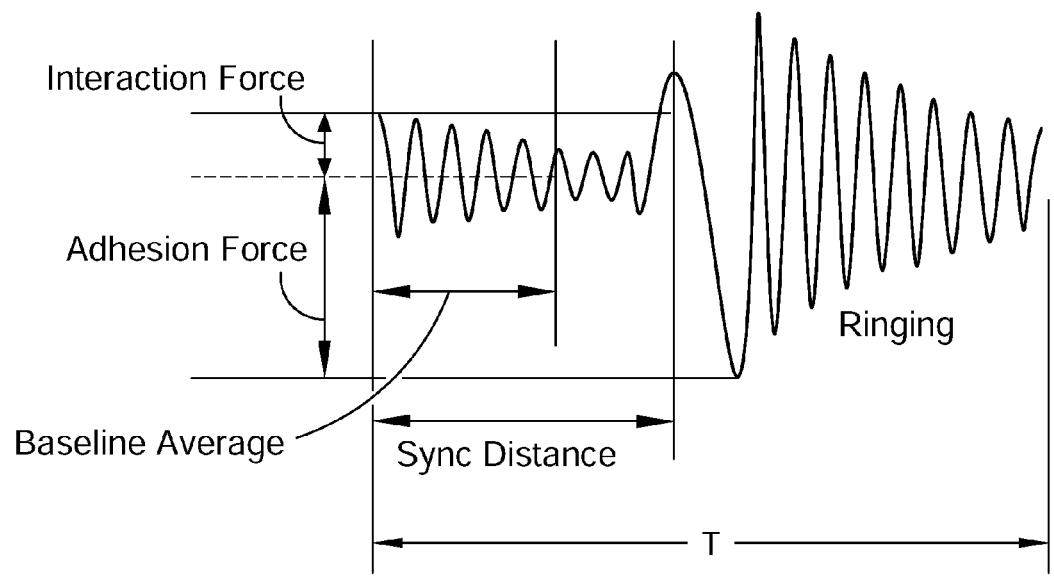
FIG. 17 is a graph of force versus time illustrating baseline calculation according to the preferred embodiments.

FIG. 17 illustrates a practical situation of the tip-sample interaction, and provides a supplemental discussion to the above in connection with FIG. 6. The real tip-sample interaction occurs only in the vicinity of the Sync Distance marker. In the interaction free region there is a residual self-oscillation of the cantilever due to break-off of the adhesion force (aka, ringdown). Such oscillation causes baseline fluctuation, rendering the same fluctuation of δFr shown in FIG. 3. Such variation will become controller noise. In order to minimize baseline fluctuation, the data marked as within the "baseline average" region are averaged into a single constant, represented by the dashed line. This constant data is used as the baseline in calculating δFr in each feedback cycle. The region for "baseline average" can vary depending on the data quality. It needs to be smaller than the Sync Distance to avoid averaging the real tip-sample interaction occurring at about the Sync Distance.

Figure 18:
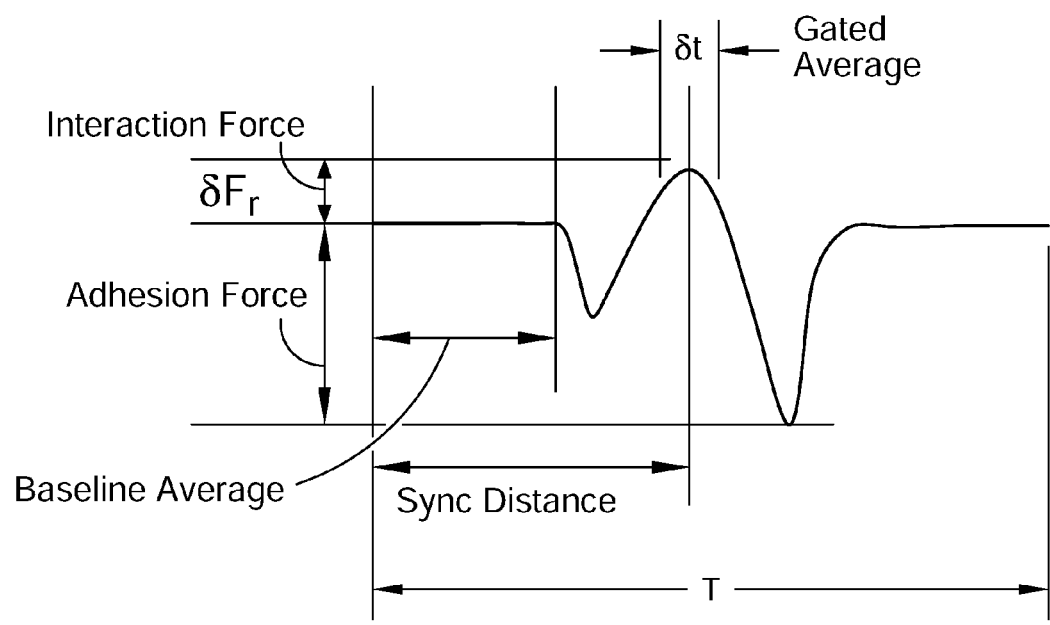
FIG. 18 is a graph of force versus time illustrating an algorithm used to determine instantaneous interaction force.

The instantaneous interaction force can be determined by using the force δFr calculated by Equation (1), in which $F_{r\_i}$ can be an instant value at the Sync Distance. As illustrated in FIG. 18, it can also be a value determined through a gated average (see also FIGS. 7 and 8A/8B). The gated average scheme uses the deflection values in the time zone δt and averages all data points in this time zone. Doing so can substantially improve signal to noise ratio. $F_{r\_i}$ serves as the setpoint in feedback control. It can vary from a value causing negative δFr to a high positive δFr. A high positive number for δFr means stronger repulsive interaction with the sample.

Figure 19:
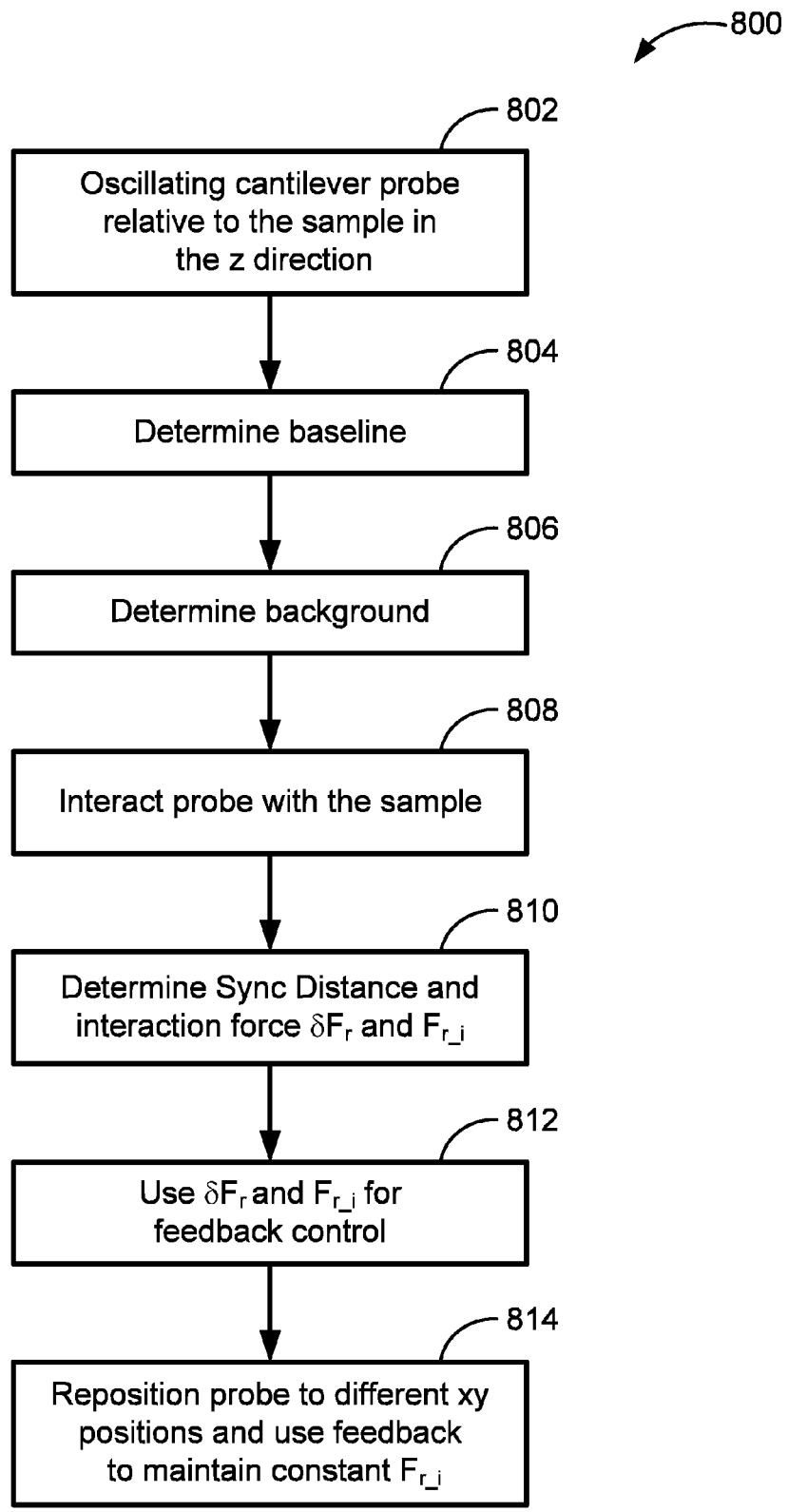
FIG. 19 is a flow diagram illustrating a method of instantaneous force control imaging.

FIG. 19 illustrates a procedure 800 of instantaneous force control used for Peak Force Tapping (PFT) imaging. In Block 802 an actuator oscillates the probe or the sample, producing relative motion with an amplitude in the range of 0.1 nm to 3 μm, peak-to-peak. At this point, the tip is relatively far away from the sample, and a baseline and background can be determined in Blocks 804 and 806. Once the background is determined, it is also subtracted from the detected deflection in Block 806 to insure the minimum detectable force is as small as possible. Block 808 operates to interact the probe with the sample by an engage, as detailed in FIGS. 15 and 16. Once the sample is interacting with the probe, the deflection data in a period T is sampled and digitized to analyze Sync Distance (FIG. 18), instantaneous force $F_{r\_i}$ and relative force δFr in Block 810. The baseline and background can be re-checked according to FIG. 14 at this Block.

Feedback is then used to maintain δFr and $F_{r\_i}$ at the preset value in Block 812. The XY scanner is also enabled, Block 814, to reposition the probe relative to the sample and eventually generate a topographic image, as well as one or more mechanical images indicative of, for example, elasticity, adhesion, and energy dissipation.

In FIG. 20 the measurement time resolved curve in FIG. 20A is converted to real space data in FIG. 20B. More particularly, FIG. 20A is a plot of the interaction force as a function of time in one modulation period. FIG. 20B is the interaction force as a function of tip-sample distance in one modulation period. The elastic property of the material can be calculated conventionally by using the upper part of the slope (see segment DE in FIG. 20B; segments CDE illustrate short range repulsive interaction) using, for example, the Oliver-Pharr model, or another contact mechanical model. (see, e.g., Oliver W C and Pharr G M 2004 *Measurement of Hardness and Elastic Modulus by Instrumented Indentation: Advances in Understanding and Refinements to Methodology J. Mater. Res.* 19 Mar. 3, 2004) The Van der Waals attraction force can be determined from the approaching curve (segment BC in FIGS. 20A and 20B), while capillary adhesion, which occurs when the tip departs from the sample, can also be calculated. (see, e.g., *"Theoretical Investigation of the Distance Dependence of Capillary and Van der Waals forces in Scanning Force Microscopy"*, Stifter et al., *Physical Review B*, Vol. 62 No. 20, Nov. 15, 2000) By moving the tip in the xy-plane, and repeating these measurements sample properties such as elasticity, Van der Waals adhesion, capillary adhesion (segment EF corresponds to attraction and capillary forces) can be imaged for the entire sample surface, or some part thereof. Furthermore, from the difference of the approaching curve and retrieving (departing) curve, the hardness of the sample can also be imaged.

Figure 1:
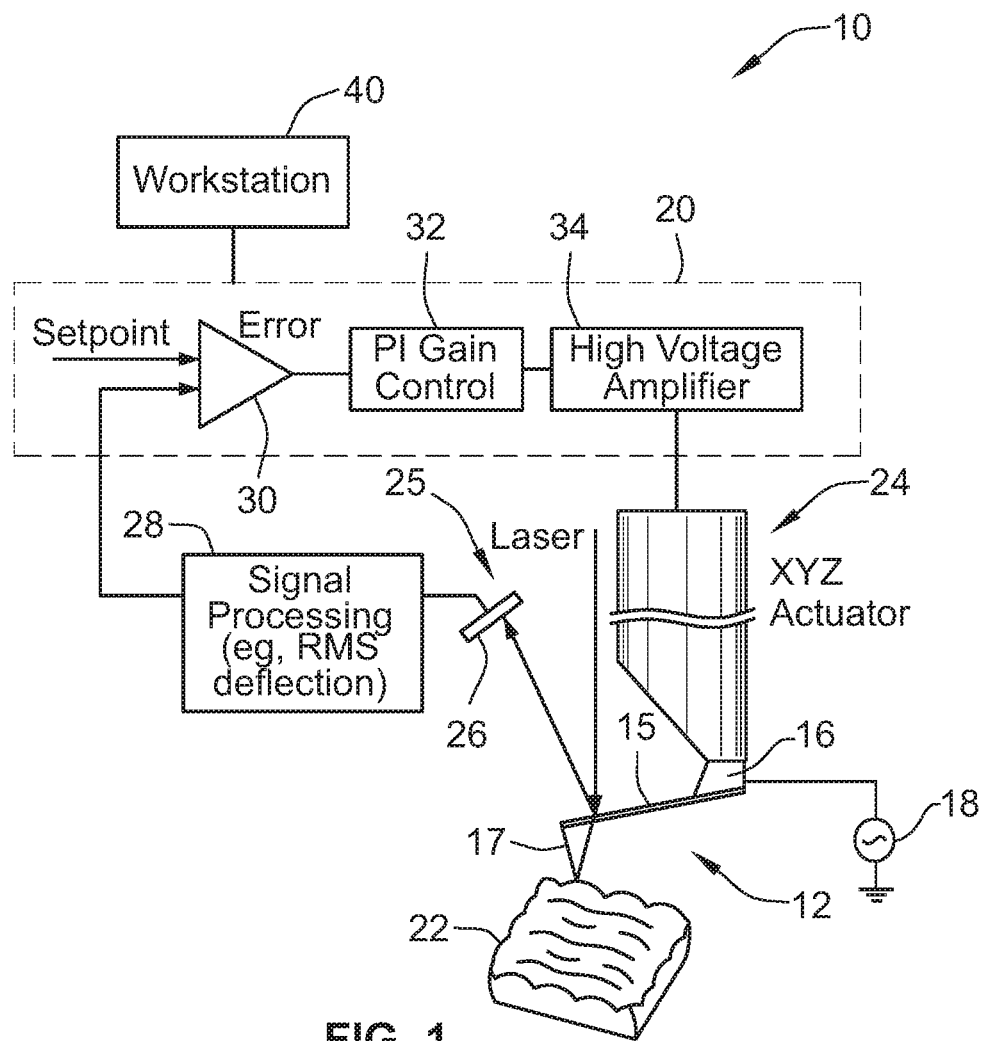
FIG. 1 is a block diagram of a conventional atomic force microscope, appropriately labeled "Prior Art"

FIG. 20B represents two types of data, namely direct measurement data and derived data. Direct measurements data are parameters, such as interaction force that are determined instantaneously within each cycle. The derived data are calculated data within each interaction cycle from any part of the curve. Such data can be deformation, which is calculated by the penetration depth from point C to point D in FIG. 20B. Another example is the dissipation energy defined by the area enclosed in the approaching curve (BCD) and withdraw curve (EFG). Yet another example is the adhesion force calculated through the difference between B and F in FIG. 20B. Any of the derived data can be used as the feedback control parameter. For example, when the deformation is chosen as the feedback parameter, the control loop in FIG. 1 will produce an image based on a constant deformation, instead of constant peak force. Any other derived data can serve the same purpose in the feedback loop.

One important application of the instantaneous force controlled imaging is in deep trench measurement. When TappingMode™ AFM is used to image deep trenches (aspect ratio of about 3:1 or more, with the most difficult trenches to image having sub-100 nm width, typically 10 nm-100 nm) the strong attractive force at the side walls can cause amplitude change, resulting in a false measurement of the trench depth. Using direct repulsive force as feedback, the feedback only responds to z-change when the tip is in contact with the sample. As a result, the force controlled feedback can measure deep trenches much more reliably than TappingMode™ AFM. FIGS. 21A and 21B provide a demonstration of this measurement. The measurement uses the same probe and sample at the same sample location. The instantaneous force control feedback loop was able to give a real trench depth measurement with the tip reaching the trench bottom (FIG. 21B). TappingMode™ AFM, on the other hand, moved the tip prematurely, yielding a much shallower depth measurement and no trench bottom was measured (FIG. 21A).

Figure 22A:
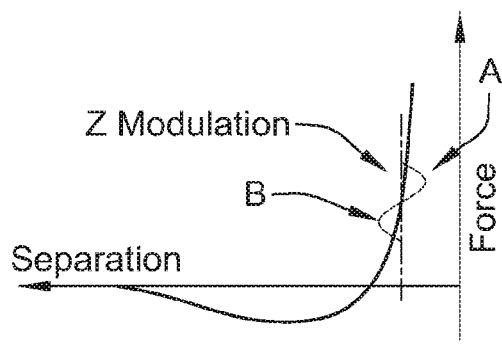
FIG. 22A is a graph of force versus tip-sample separation, illustrating small amplitude repulsive force mode (SARF) according to the preferred embodiments.
Figure 22B:
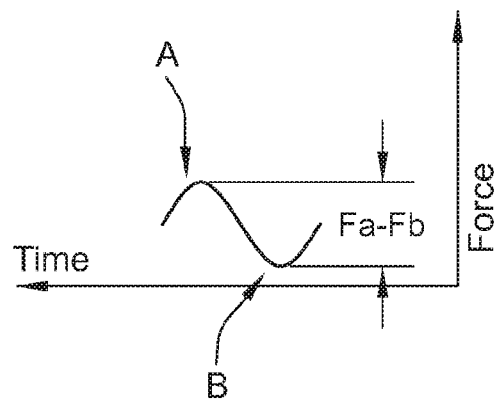
FIG. 22B is a graph illustrating force versus time for the SARF mode.

Referring finally to FIGS. 22A/22B and 23A/23B, additional features of the present invention are described. In FIGS. 22A and 22B, the AFM is operated to modulate Z at an amplitude small enough (e.g., sub-nanometer) to make sure that tip-sample interaction always stays in the repulsive force zone (Small Amplitude Repulsive Force Mode or SARF Mode), i.e., a few nanometers away from surface. This is accomplished by using either peak-to-peak force difference ($F_a-F_b$, corresponding to the peak-to-peak Z modulation), or amplitude output of a lock-in amplifier, as feedback. The feedback parameter is proportional to the repulsive force gradient if the amplitude is small enough in which case the force gradient is linear. In this case, feedback is only sensitive to short range chemical bonding forces, forces corresponding to atomic resolution. As a result, the present technique is ideal for high resolution imaging.

Figure 23A:
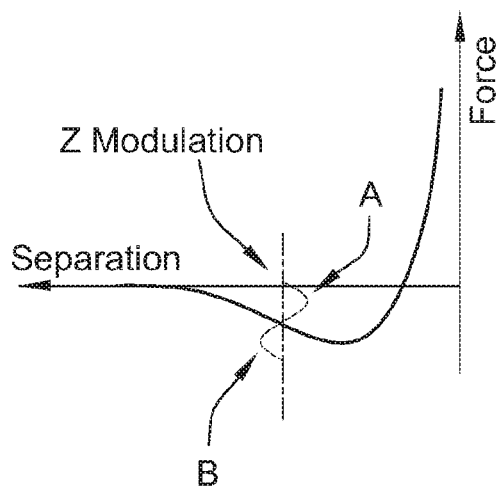
FIG. 23A is a graph of force versus tip-sample separation, illustrating small amplitude attractive force mode (SAAF) according to the preferred embodiments.
Figure 23B:
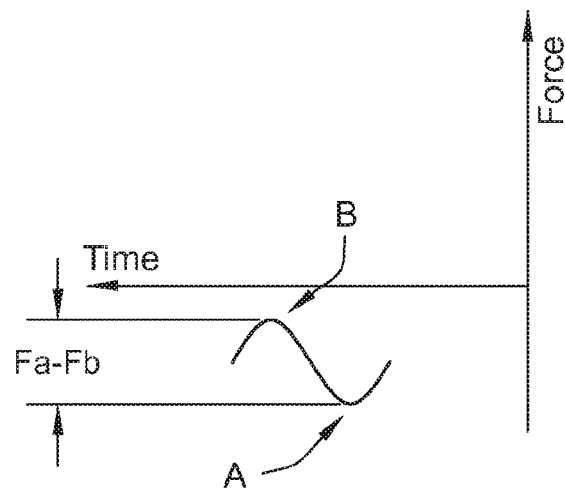
FIG. 23B is a graph illustrating force versus time for the SAAF mode.

In FIGS. 23A and 23B, a similar arrangement to that shown in FIGS. 22A/22B is shown, but the attractive force portion of the force curve is employed (Small Amplitude Attractive Force Mode or SAAF Mode). In this case, the system modulates Z at an amplitude that is small enough to make sure tip-sample interaction stays in the attractive force zone all the time. Again, either simple peak-to-peak force difference ($F_a-F_b$), or amplitude output of a lock-in amplifier, can be used as feedback given that the feedback parameter is proportional to the attractive force gradient if the amplitude is small enough so that the force gradient is linear. This technique is the least destructive to the sample since the tip does not make contact with the sample. In comparison to the Small Amplitude Repulsive Force Mode, the feedback polarity is inversed.

Advantages

In sum, the benefits of PFT Mode AFM operation are numerous. Given the inherently stable long term force control, drift-free sample imaging can be achieved along with simultaneous height, stiffness, adhesion, elasticity and plasticity mechanical property measurements at TappingMode™ speeds. Because the technique is not impacted by DC drift (PFT mode creates its own reference every few hundred microseconds), steady operation is not compromised even without an expert operator. This allows the SPM to run for hours, even days (large samples-long time) without substantially compromising image integrity, particularly useful for in-process measurements, like crystal growth and monitoring polymer phase change, which can take several minutes or hours. Notably, a Peak Force Tapping image can be generated at an operating bandwidth greater than 2 kHz. Tapping Mode bandwidth is about 1 kHz, primarily because cantilever dynamics control speed, e.g., it takes at least several milliseconds to stabilize to return to resonance (greater the amplitude error, the slower). The disclosed embodiments can also eliminate phase interpretation problems because it independently measures elasticity, adhesion, energy dissipation, etc. All these factors contribute to the phase of cantilever oscillation.

Moreover, PFT Mode is insensitive to cantilever dynamics because there is no need to wait for complete cantilever ringdown once the probe releases from the sample. This allows for high speed imaging in vacuum and also allows for arbitrary choice among cantilever options. This difference allows mapping over several orders of magnitude of interaction force, while repulsive force resolution can be used to produce artifact free cellular imaging.

The fact that PFT Mode does not have to operate at the resonance frequency of the probe offers a major advantage when imaging in fluid. Due to various parasitic coupling forces in fluid, cantilever tuning is a key issue in obtaining a fluid image. PFT Mode completely removes the need to tune the cantilever (baseline averaging, background subtraction, etc.). Furthermore, the range of force control and the ability to use a cantilever having a much wider spring constant range (typically, greater than 0.3 N/m for TappingMode™ AFM only, while PFT Mode can use cantilevers having spring constants as low as 0.01 N/m) gives imaging control much more room for biological sample imaging.

Again, this is due to the fact that PFT Mode does not depend on the oscillation energy stored in the cantilever to overcome capillary adhesion forces. Because the technique utilizes an external actuation element (of the feedback circuit, preferably triggering on peak force), the mechanism to overcome the capillary forces is far more powerful than in TappingMode™ wherein the static elastic energy of the cantilever itself (fed by the kinetic energy of the oscillating probe) pulls the tip away from the sample in overcoming the capillary forces. As a result, there is virtually no limitation on the cantilever spring constant to operate stably in presence of a capillary layer. PFT Mode therefore enables stable tapping control operation using a cantilever having a spring constant at least as low as 0.01 N/m.

Yet another benefit of the peak force tapping control is the ability to use cantilevers from 0.01 N/m to 1000 N/m in one mode of AFM operation. It enables high resolution mechanical property mapping of the broadest range of materials on a single instrument from 10 kPa to 100 GPa in elastic modulus.

In addition, given essentially instantaneous force feedback, tip crashing is virtually eliminated. Also, because the deflection is hydrodynamically corrected, no tuning is typically required, and therefore fast, ready setup by virtually any user can be accomplished.

When compared to existing modes of AFM operation, the low force high speed imaging provided by PFT Mode in combination with the low average tracking force and the virtual elimination of lateral forces on the tip, provide a significant advance in high speed imaging over a wide variety of samples. For example, single molecule elasticity can be measured, as well as narrow DNA samples in fluid (e.g., 2 nm wide DNA). By comparison, when imaging DNA in fluid, TappingMode™ AFM has at least a 2 nm lower resolution. Moreover, measuring DNA stiffness in fluid is challenging with TappingMode™ AFM because it does not have property quantification capacity, it primarily is only able to provide relative mechanical property measurements (for example, by looking at contrast in phase images). With the present technique, property measuring down to the molecular level can be achieved.

In the end, PFT Mode can acquire data as good as or better (a resolution [e.g., less than a 100 nm, and more preferably less than about 1 nm laterally], etc.) than that acquired in TappingMode™ AFM without damaging the tip and/or the sample. The technique provides significant speed improvement over other known force feedback techniques and does so without requiring the use of a small lever. In fact, a rather large lever (>60 µm long) can be operated at sub-resonance in PFT Mode so that the lever response has a bandwidth far beyond that achievable when using a so-called small cantilever (>10 kHz).

Of course, an additional benefit of the present preferred embodiments is that a force curve is generated with every pixel so that the image provides information beyond a typically TappingMode™ AFM image. With every pixel, the user can obtain quantitative information regarding stiffness, adhesion, elasticity, plasticity, etc. And again, because baseline tip-sample separation is re-zeroed with every pixel, drift is minimized so that a large improvement in productivity and image reliability is realized.

In review, the present PFT Mode provides very low force imaging to provide very high resolution using real time property mapping (i.e., instantaneous force control). The force control is inherently stable (essentially drift free), over a term sufficiently long to image a sample with minimal or no user intervention. The system allows faster, simpler set-up because no tuning is required (baseline averaging and hydrodynamic background correction). Moreover, precise control over force basically eliminates tip crash, while the technique/system also essentially eliminates lateral force on the sample surface. The system is also insensitive to cantilever dynamics by not having to wait for probe ringdown before interacting the probe with the sample once it releases from the sample. And, as discussed, a wide range of cantilevers are available to the user to obtain simultaneous measurements of height, stiffness, adhesion, elasticity and plasticity at TappingMode™ AFM speeds (>2 kHz). The present SPM can image samples such as 2 nm wide DNA in fluid with these characteristics, as well make improved mechanical property measurements such as single molecule elasticity.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A scanning probe microscope (SPM) comprising:
an actuator to generate relative motion between a probe and a sample,
a detector to detect motion of the probe;
a digital controller including FPGA architecture to determine, from the detected probe motion, a probe deflection based on a probe-sample interaction, the probe deflection being substantially independent of parasitic probe deflection, wherein the parasitic probe deflection corresponds to any relative periodic motion between the probe and the sample when the probe is not interacting with the sample; and wherein the controller controls the SPM in real time using the probe deflection; and wherein an amplitude of a probe-sample interaction is less than an amplitude of the parasitic probe deflection.

2. The SPM of claim 1, wherein the controller identifies an instantaneous force associated with the interaction.

3. The SPM of claim 2, wherein the actuator provides relative oscillatory motion between the probe and the sample, and wherein the instantaneous force is identified prior to the completion of one cycle of the oscillatory motion.

4. The SPM of claim 3, wherein the instantaneous force is used to maintain a setpoint during imaging.

5. The SPM of claim 4, wherein the instantaneous force is a repulsive force.

6. The SPM of claim 4, wherein a minimum controllable force corresponding to the instantaneous force is less than about 1000 μN.

7. The SPM of claim 6, wherein the minimum controllable force is less than about 10 pN.

8. The SPM of claim 6, wherein the detected probe motion is synchronously averaged to reduce the minimum controllable force.

9. The SPM of claim 1, wherein the parasitic probe deflection corresponds to any relative periodic motion between the probe and the sample when the probe is not interacting with the sample.

10. The SPM of claim 9, wherein the relative periodic motion between the probe and the sample when the probe is not interacting with the sample is caused by the hydrodynamic background associated with operation of the SPM.

11. The SPM of claim 1, wherein the controller acquires an image with a resolution of less than 100 nm 12. The SPM of claim 1, wherein the controller acquires an image with a maximum tracking force of less than 10 pN.

13. The SPM of claim 1, wherein the probe has a spring constant between about 0.1 N/m and 1000 N/m.

14. The SPM of claim 1, wherein the actuator is controlled by a feedback loop using a pre-determined synchronous distance in each interaction period.

15. The SPM of claim 10, wherein the controller performs at least one of lock-in amplification and synchronous averaging to subtract the hydrodynamic background.

* * * * *